US009302203B2

(12) United States Patent
Qiu et al.

(10) Patent No.: US 9,302,203 B2
(45) Date of Patent: Apr. 5, 2016

(54) CHROMATOGRAPHIC SEPARATION MATERIAL

(75) Inventors: Haixiao Qiu, Arlington, TX (US); Daniel W. Armstrong, Arlington, TX (US); Mayumi Kiyono-Shimobe, Kitakyusyu (JP)

(73) Assignees: MITSUBISHI CHEMICAL CORPORATION, Fukuoka (JP); AZYP, LLC, Arlington, TX (US)

( * ) Notice: Subject to any disclaimer, the term of this patent is extended or adjusted under 35 U.S.C. 154(b) by 546 days.

(21) Appl. No.: 13/560,539

(22) Filed: Jul. 27, 2012

(65) Prior Publication Data

US 2014/0021136 A1   Jan. 23, 2014

Related U.S. Application Data

(60) Provisional application No. 61/674,162, filed on Jul. 20, 2012.

(51) Int. Cl.
| | |
|---|---|
| B01D 15/38 | (2006.01) |
| C08F 8/00 | (2006.01) |
| B01J 20/29 | (2006.01) |
| B01J 20/28 | (2006.01) |
| B01J 20/288 | (2006.01) |
| B01J 20/32 | (2006.01) |

(Continued)

(52) U.S. Cl.
CPC .......... B01D 15/3833 (2013.01); B01J 20/288 (2013.01); B01J 20/28057 (2013.01); B01J 20/28069 (2013.01); B01J 20/29 (2013.01); B01J 20/321 (2013.01); B01J 20/328 (2013.01); B01J 20/3219 (2013.01); B01J 20/3274 (2013.01); C08F 8/00 (2013.01); B01D 15/305 (2013.01); B01D 15/40 (2013.01); B01J 2220/52 (2013.01); B01J 2220/54 (2013.01); B01J 2220/86 (2013.01)

(58) Field of Classification Search
CPC .. B01D 15/3833; B01D 20/29; B01D 15/305; B01D 15/40; C08F 8/00; B01J 20/28069; B01J 20/288; B01J 20/321; B01J 20/3219; B01J 20/3274; B01J 20/328; B01J 20/28057; B01J 2220/54; B01J 2220/86; B01J 2220/52
USPC ............................ 210/635, 656, 198.2, 502.1
See application file for complete search history.

(56) References Cited

U.S. PATENT DOCUMENTS

| | | | | |
|---|---|---|---|---|
| 4,169,079 | A | * | 9/1979 | Tabushi et al. ............... 525/54.2 |
| 4,539,399 | A | * | 9/1985 | Armstrong .................... 536/103 |
| 5,114,577 | A | * | 5/1992 | Kusano et al. ............. 210/198.2 |

(Continued)

FOREIGN PATENT DOCUMENTS

| | | | |
|---|---|---|---|
| JP | 06-262070 | * | 9/1994 |
| WO | 2010/148191 | | 12/2010 |

OTHER PUBLICATIONS

The machine language translation of Japan Patent No. 6-26270 published Sep. 1994.*

(Continued)

Primary Examiner — Ernest G Therkorn
(74) Attorney, Agent, or Firm — Lucas & Mercanti, LLP

(57) ABSTRACT

The chromatographic separation material is a cyclofructan or a derivative of cyclofructan covalently bonded to a cross-linked, organic polymer. The separation material works well in hydrophilic interaction liquid chromatography.

9 Claims, 11 Drawing Sheets

(51) Int. Cl.
*B01D 15/30* (2006.01)
*B01D 15/40* (2006.01)

(56) References Cited

U.S. PATENT DOCUMENTS

| | | | | |
|---|---|---|---|---|
| 5,164,427 | A | * | 11/1992 | Wulff et al. .................... 523/219 |
| 6,017,458 | A | * | 1/2000 | Ng et al. ........................ 210/635 |
| 6,042,723 | A | * | 3/2000 | Duval et al. ................. 210/198.2 |
| 6,071,410 | A | * | 6/2000 | Nau et al. ...................... 210/635 |
| 7,597,804 | B2 | * | 10/2009 | Duval et al. ................. 210/198.2 |
| 2003/0159992 | A1 | * | 8/2003 | Ng et al. ........................ 210/656 |
| 2010/0320373 | A1 | * | 12/2010 | Appelblad .................... 250/282 |
| 2011/0024292 | A1 | | 2/2011 | Armstrong |

OTHER PUBLICATIONS

Mishio Kawamura, et al. Formation of a Cycloinulo-Oligosaccharide From Inulin by an Extracellular Enzyme of Bacillus circulans OKUMZ 31B, Carbohydrate Research. 1989. vol. 192. p. 83-90. Elsevier Science Publishers B.V., Amsterdam, Netherlands.

* cited by examiner

CHROMATOGRAPHIC SEPARATION MATERIAL

This Application claims the priority of U.S. Provisional Application No. 61/674,162, filed Jul. 20, 2012, the content of which is hereby incorporated by reference.

BACKGROUND OF THE INVENTION

1. Field of the Invention

The present invention relates to chromatography and more particularly to a chromatographic separation material, method to make the chromatographic separation material and a method to use the chromatographic separation material. The chromatographic separation material is especially suited for chiral enantiomeric separations.

2. Prior Art

In the past few decades, chiral enantiomeric separations have gained great attention among many chromatography separations. While over a hundred types of chiral separation materials have been developed, only a few types/classes dominate the field of chiral separations in industry. These materials are made by coating or covalently bonding chiral selectors to supports, typically inorganic silica gel supports. Examples of the dominant classes of chiral selectors include polysaccharide, macrocyclic antibiotic, and π complex.

Cyclofructans (CFs) are chiral selectors by bonding it to silica gel in US2011/0024292. They are a group of macrocyclic oligosaccharides consisting of six or more β-(2→1) linked D-fructofuranose units. A common shorthand nomenclature for these compounds is CF6, CF7, CF8, etc., where the number denotes the number of fructose moieties (i.e., 6, 7, 8, etc.) in the cyclic oligomer.

Cyclofructans were first reported by Kawamura and Uchiyama (Kawamura, M. and Uchiyama, K. Carbohydr. Res., 1989, 192). As the reference describes, cyclofructans can be produced via fermentation of inulin by at least two different strains of *Bacillus circulans*. The gene that produces the cycloinulo-oligosaccharide fructanotransferase enzyme (CF Tase) has been isolated, and its sequence determined and incorporated into the common yeast, *Saccharomyces cerevisiae*. Hence, the facile production of CFs is possible. The basic structure of CF6 is depicted in FIG. 1. The x-ray crystal structure of CF6 has shown that the smaller CFs has no hydrophobic cavities as do cyclodextrins. Consequently, hydrophobic inclusion complexation, which plays an important role in the association of organic molecules with cyclodextrins, does not seem to be relevant for cyclofructans.

The pentose moieties (fructoses) of CFs alternatively form a propeller-like circumference around a crown ether core unit. For example, the crystal structure of CF6 reveals that six fructofuranose rings are arranged in a spiral or propeller fashion around the 18-crown-6 core, oriented either up or down toward the mean plane of the crown ether. Six three-position hydroxy groups alternate to point toward or away from the molecular center, and the three oxygen atoms pointing inside are very close to each other (~3 Å). It is clear that there is considerable internal hydrogen bonded hydroxy groups. The other side of CF6 appears to be more hydrophobic, resulting from the methylene groups of —O—C— $CH_2$—O— around the central indentation. A computational lipophilicity pattern of CF6 also confirms clear "front/back" regionalization of hydrophilic and hydrophobic surfaces. Both the crystal structure and computational modeling studies demonstrate that CF6 appears to have considerable additional internal hydrogen bonding interactions. Therefore, CF6 is different from other 18-crown-6 based chiral selector for reasons of (i) three 3-OH groups completely cover one side of the 18-crown-6 ring and (ii) the core crown oxygen are almost folded inside the molecule.

US2011/0024292 (WO2010/148191) discloses examples of separation performance of CFs bonded to solid silica gel as a separation material. While the '292 application teaches CFs as a chiral selector, the supporting material, namely silica gel, has drawbacks. Silica gel may not be best suited for chiral and hydrophilic interaction liquid chromatography (HILIC) separations. In addition, silica gel has a limitation in durability against using alkali solvents, in cost for bulk material and ease of scale-up.

SUMMARY OF THE INVENTION

It is the object of the present invention to solve some of these drawbacks in the prior art and to provide a new separation material, a method to make the new separation material and a method to use the new separation material.

The separation material of the present invention can be used in various separations. In particular, this separation material performs well with hydrophilic interaction liquid chromatography (HILIC) separation.

The above-described object has been discovered through extensive research. The object of the present invention is obtained with the chromatographic separation material described below.

Item (1) A chromatographic separation material comprising a cross-linked, organic polymer; and a compound of Formula (I):

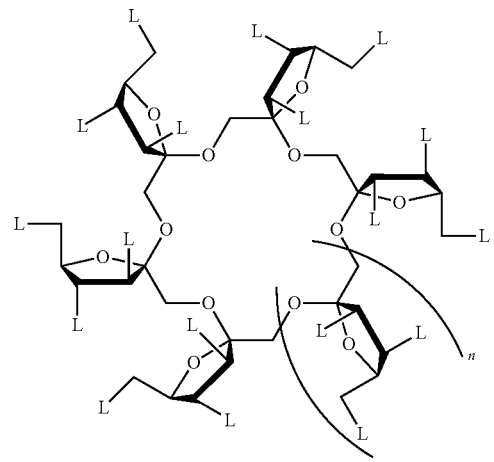

wherein:

n is 1-3;

each L is, independently,

OR, $CR_3$, $NR^2R$,

O—C(=O)—R,

O—C(=O)—$NR^2$—R, $NR^3$C(=O)—$NR^2$R, or

substituted with R;
each R is, independently,
H,
$(C_1-C_{20})$alkyl group optionally substituted with 1-3 $R^1$,
$(C_3-C_{20})$cycloalkyl group optionally substituted with 1-3 $R^1$,
$(C_5-C_{40})$aryl group optionally substituted with 1-3 $R^1$,
heteroaryl group optionally substituted with 1-3 $R^1$,
$(C_1-C_{20})$alkoxy$(C_1-C_{20})$alkyl group,
$H_2C=CH—$(when L is O—C(=O)—R),
$H_2C=C(CH_3)—$(when L is O—C(=O)—R),
alkylenyl-N=C=O;
arylenyl-N=C=O;
—$SO_2R^5$ (when L is OR),
=$SO_3$ (when L is OR),
$(C_5-C_{50})$aryl$(C_1-C_{20})$alkyl group optionally substituted with 1-3 $R^1$, or saccharide residue lacking a hydroxy group (when L is OR), or
a covalent bond to the cross-linked organic polymer;
$R^1$ is, independently, $(C_1-C_{10})$alkyl group optionally substituted with 1-3 $R^6$, halo group, hydroxy group, —$NR^3R^4$, —$COOR^2$, —$COR^2$, nitro group, trihaloalkyl group, or —$Si(OR^2)_3$;
$R^2$ is, independently, H or $(C_1-C_{10})$alkyl group;
$R^3$ is, independently, H or $(C_1-C_{10})$alkyl group;
$R^4$ is, independently, H or $(C_1-C_{10})$alkyl group;
$R^5$ is, independently, $(C_1-C_{20})$alkyl group optionally substituted with 1-3 $R^1$, $(C_5-C_{50})$aryl optionally substituted with 1-3 $R^1$, or heteroaryl optionally substituted with 1-3 $R^1$;
$R^6$ is, independently, halo group, hydroxyl group, —$NR^3R^4$, —$COOR^2$, —$COR^2$, nitro group, trihaloalkyl group or —$Si(OR^2)_3$;
wherein at least one R is a covalent bond to the cross-linked organic polymer.

Item (2) The chromatographic separation material of Item (1), wherein the cross-linked, organic polymer is a styrene-based cross-linked polymer and/or a (meth)acrylic-based polymer.

Item (3) The chromatographic separation material of Item (2), wherein the cross-linked, organic polymer comprises a specific surface area of 10 to 1200 m²/g.

Item (4) The chromatographic separation material of Item (2), wherein the cross-linked, organic polymer comprises a pore volume of 0.1 to 3.0 ml/g.

The method to use the chromatographic separation material of the present invention is described below:

Item (5) A method of chromatographic separation comprising:
providing a stationary phase comprising the chromatographic separation material of any one of Items (1) to (4); and
contacting the stationary phase with a mobile phase comprising an analyte so as to separate the analyte.

Item (6) The method of Item (5), wherein the stationary phase is provided by packing the stationary phase in a column.

Item (7) The method of Item (5) or (6), wherein the mobile phase comprises a solvent and the analyte is carried in the solvent.

Item (8) The method of Item (5), (6) or (7), wherein the analyte comprises enantiomeric isomers.

Item (9) The method of Item (6), wherein the stationary phase fills the inside void of the column.

Item (10) The method of Item (6), wherein the stationary phase is packed along the inside walls of the column.

The method to make the chromatographic material of the present invention is described below:

Item (11) A method for preparing a chromatographic separation material of Item (2) comprising:
(i) an immobilization of native or a derivatized cyclofructan on a cross-linked organic polymer; or
(ii) a polymerization of native or derivatized cyclofructan-containing monomers.

Item (12) The method of Item (11), wherein the chromatographic separation material is further derivatized on the cyclofructan.

Item (13) The method of Item (11), wherein the immobilization of native or a derivatized cyclofructan on a cross-linked organic polymer comprises:
a) preparing a functional group containing cross-linked organic polymer; and
b) reacting the functional group containing cross-linked organic polymer with a hydroxyl group of native or a derivatized cyclofructan to immobilize native or a derivatized cyclofructan on a cross-linked organic polymer.

Item (14) The method of Item (13), wherein the hydroxyl group of native or a derivatized cyclofructan is further activated to react with the functional group of the cross-linked organic polymer.

Item (15) The method of Item (14), wherein the activating group is selected from the group consisting of chloroformate, activated carbonate, alkyne, p-toluenesulfonate, p-nitrophenoxycarbonyl, and isocyanate.

Item (16) The method of Item (13), wherein the functional group is selected from a group consisting of epoxy group, halo group, carboxy group, amino, hydroxyl, chloroformate, p-nitrophenoxycarbonyl, isocyanate, chlorocarbonyl, azide, Item (17) The method of Item (13), wherein the functional group containing cross-linked organic polymer is a product of suspension polymerization of (meth)acrylic monomer, glycidylmethacrylate, styrene monomer, or ethylstyrene, and a cross-linking monomer.

Item (18) The method of Item (17), wherein the cross-linking monomer is divinylbenzene.

Item (19) The method of Item (16), wherein the functional group containing cross-linked organic polymer is prepared by reacting a carboxy group of a cross-linked organic polymer with thionyl chloride.

Item (20) The method of Item (16), wherein the functional group containing cross-linked organic polymer is prepared by reacting a hydroxyl or an amino group of a cross-linked organic polymer with an diisocyanate or isocyanate reagent.

Item (21) The method of Item (16), wherein the functional group containing cross-linked organic polymer is prepared by reacting a hydroxyl group of a cross-linked organic polymer with a p-nitrophenylchloroformate.

Item (22) The method of Item (11), wherein the polymerization of native or derivatized cyclofructan-containing monomers is achieved in the presence of one or more cross-linking monomer.

Item (23) The method of Item (22), wherein the cross-linking monomer is ethylene glycol dimethacrylate.

Item (24) The chromatographic separation material of Item (1) selected from the group consisting of:

5
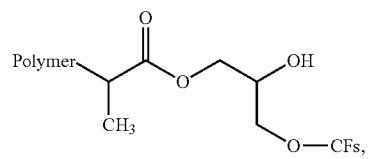
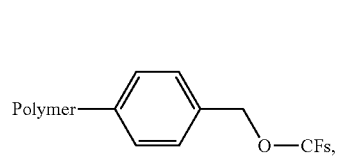
6
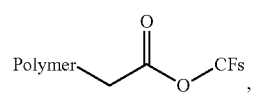
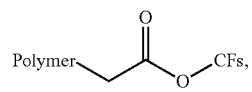
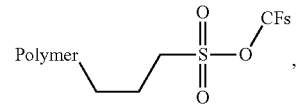
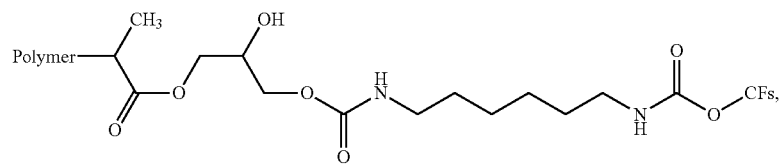
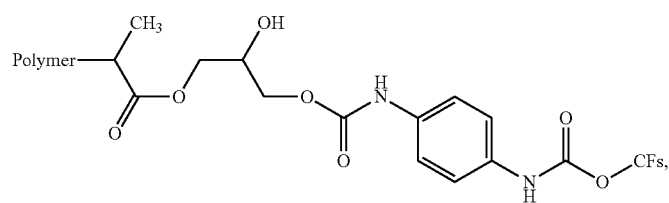
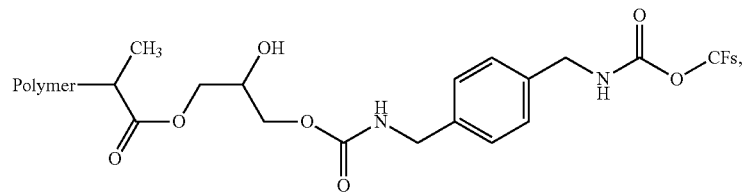
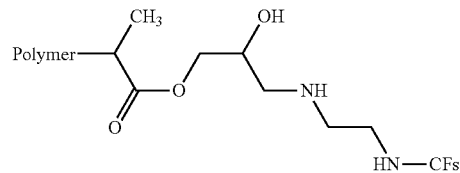
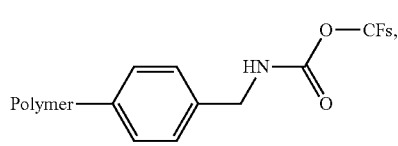
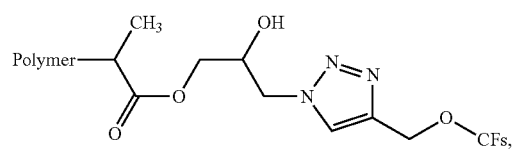
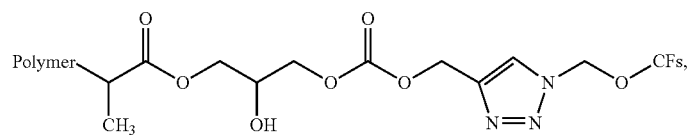
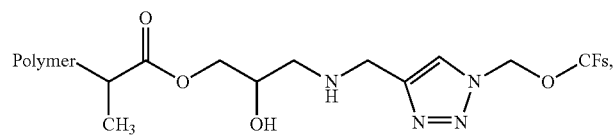

-continued

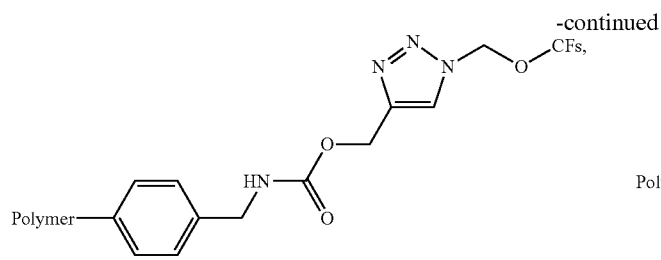
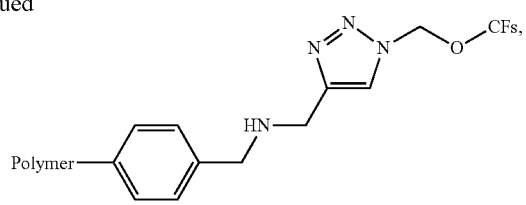
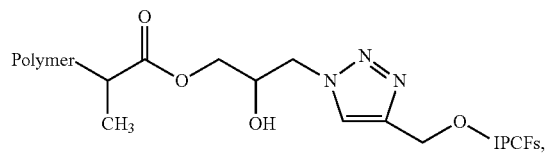
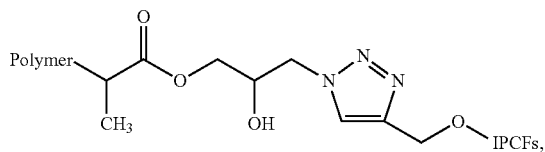
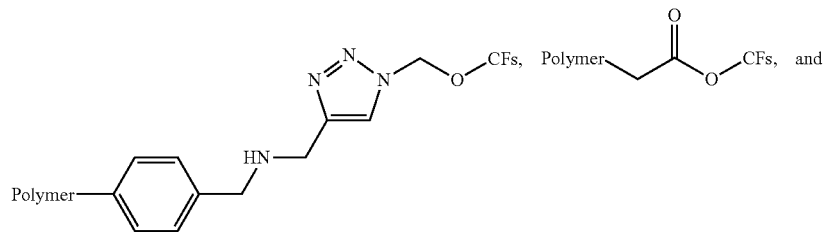
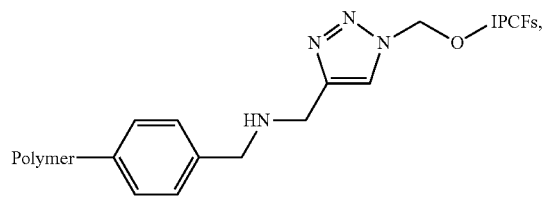

wherein, polymer is a cross-linked organic polymer and CF$_s$ is a cyclofructan, having 6, 7 or 8 fructose moieties.

Not wishing to be bound by theory, it is believed that a cross-linked organic polymer covalently bonded to a compound of Formula (I) can be produced in accordance with the principle of the present invention so as to provide suitable separation material. This section describes speculated reasons that a chromatographic separation material of the present invention has exceptional performance in HILIC separations and chiral separations in particular.

The higher the degree of hydrophilicity of the separation material generally results in better HILIC separation performance. Typical silica-based materials, such as disclosed in US2011/0024292 A1, comprise either alkyl groups and/or silanol groups on the surface. On the other hand, a compound of this invention provides various kinds of functional groups, in addition to alkyl groups. This offers one to control the level of the hydrophilicity by introducing designed functional groups in the polymer material, which was not previously possible, essentially enabling one to control the HILIC separation performance.

Chiral separations typically depend on interactions between chiral selectors, such as native or derivatized cyclofructans, and chiral compounds. Hydrogen bonding interactions are believed to be essential. Typical chiral separation materials are comprised of the chiral selector comprising of chial selectors covalently attached to inorganic silica gel, such as disclosed in US2011/0024292 A1. The silica contains silanol group, which may interfere with hydrogen bonding taking place between chiral selector and separating compounds. On the other hand, the compound of Formula (I) of the present invention, a cross-linked organic polymer linked to cyclofructans, offers attractive alternatives since the functional groups of the organic polymer can be modified easily for improved linkage to cyclofructans, while silica does not have such flexibility. In addition this facile modification enables designing the surface functional group to enhance characteristics of the chiral selector.

DETAILED DESCRIPTION OF THE INVENTION

Cyclofructans and their Derivatives

Figure 1:
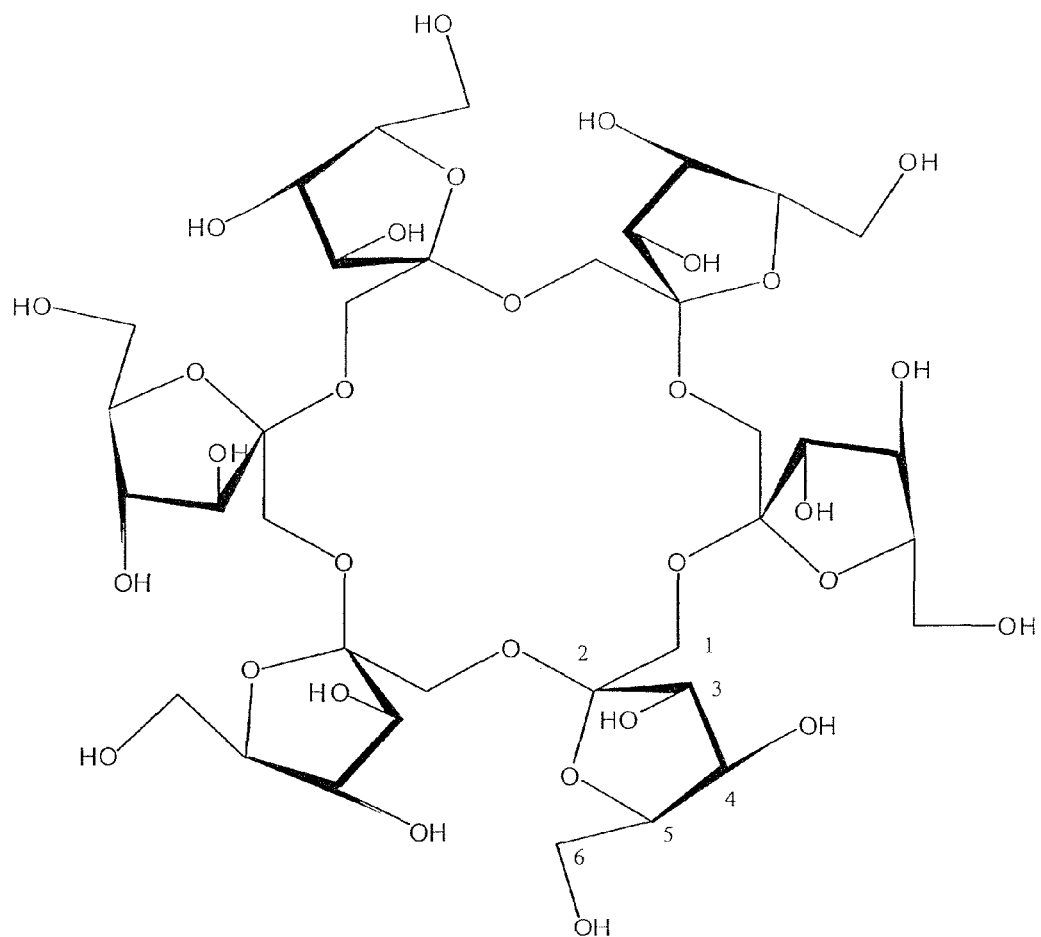
FIG. 1 depicts the basic structure of cyclofructan six (CF6)

Embodiments of the present invention comprise cyclofructans and their derivatives as shown in Formula (I):

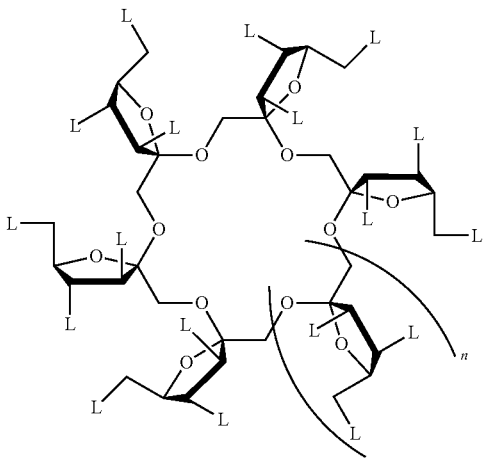

wherein:
n is 1-3;
each L is, independently,
  OR,
  $CR_3$,
  $NR^2R$,
  O—C(=O)R,
  O—C(=O)—$NR^2R$,
  $NR^3$C(=O)—$NR^2R$, or

substituted with R;
each R is, independently,
  H,
  methyl, ethyl, n-propyl, isopropyl, n-butyl, t-butyl, cyclohexyl, phenyl, tolyl, xylyl, chloro, bromo, iodo, trichloromethyl, trichlorophenyl, chlorophenyl, bromophenyl, iodophenyl, hydroxyethyl, hydroxypropyl, dichlorophenyl, benzyl, chlorotolyl, naphthylethyl, nitrophenyl, dinitrophenyl, trinitrophenyl, trifluoromethyl, dinitro, 3,5-dimethylphenyl, or adamantly.
  $(C_1$-$C_{20})$alkyl optionally substituted with 1-3 $R^1$,
  $(C_3$-$C_2)$cycloalkyl optionally substituted with 1-3 $R^1$,
  $(C_1$-$C_{10})$aryl optionally substituted with 1-3 $R^1$,
  heteroaryl optionally substituted with 1-3 $R^1$,
  $(C_1$-$C_{20})$alkoxy$(C_1$-$C_{20})$alkyl,
  $H_2C$=CH—(when L is O—C(=O)R),
  $H_2C$=C($CH_3$)—(when L is O—C(=O)R),
  alkylenyl-N=C=O;
  arylenyl-N=C=O;
  —$SO_2R^5$ (when L is OR),
  =$SO_3$ (when L is OR),
  $(C_5$-$C_{50})$aryl$(C_1$-$C_{20})$alkyl optionally substituted with 1-3 $R^1$, or saccharide residue lacking a hydroxy group (when L is OR);

$R^1$ is, independently, $(C_1$-$C_{10})$ alkyl group optionally substituted with 1-3 $R^6$, halo group, hydroxyl group, —$NR^3R^4$, —$COOR^2$, —$COR^2$, nitro group, trihaloalkyl group, or —Si$(OR^2)_3$;

$R^2$ is, independently, H or $(C_1$-$C_{10})$alkyl group;

$R^3$ is, independently, H or $(C_1$-$C_{10})$alkyl group;

$R^4$ is, independently, H or $(C_1$-$C_{10})$alkyl group;

$R^5$ is, independently, $(C_1$-$C_{20})$alkyl group optionally substituted with 1-3 $R^1$, $(C_5$-$C_{50})$aryl group optionally substituted with 1-3 $R^1$, or heteroaryl group optionally substituted with 1-3 $R^1$; and $R^6$ is, independently, halo group, hydroxyl group, —$NR^3R^4$, —$COOR^2$, —$COR^2$, nitro group, trihaloalky group or —Si$(OR^2)_3$.

In some embodiments of the present invention comprising a compound of Formula (I), one or more L groups in a compound of Formula (I) is OR. In that case, O is a divalent moiety and is connected to the CF and the R group as described herein. In other embodiments of the present invention, one or more L groups is $CR_3$. In that case, $CR_3$ is a divalent moiety and is connected to the CF and the R group as described herein. In some embodiments, one or more L groups is $NR^2$. In that case, $NR^2$ is a divalent moiety and is connected to the CF and the R group as described herein. In other embodiments of the present invention, one or more L groups is O—C(=O)R. In that case, O—C(=O) is a divalent moiety and is connected to the CF and the R group as described herein. In still other embodiments of the present invention, one or more L groups is O—C(=O)—$NR^2R$. In that case, O—C(=O)—$NR^2$ is a divalent moiety and is connected to the CF and the R group as described herein. In some embodiments of the present invention, one or more L groups is $NR^3C$(=O)—$NR^2R$. In that case, $NR^3C$(=O)—$NR^2$ is a divalent moiety and is connected to the CF and the R group as described herein. In other embodiments of the present invention, one or more L groups is the cycloaddition product of a 1,3-dipolar cycloaddition reaction between an azide and an alkyne (click chemistry). In that case, the cycloaddition product is a divalent moiety and can be connected to the CF and the R group as described herein. In some embodiments of the present invention comprising a compound of Formula (I), n is 1. In other embodiments, n is 2. In still other embodiments, n is 3.

In some embodiments of the present invention comprising a compound of Formula (I), at least one L is OR. In other embodiments, at least one L is O—C(=O)R. In still other embodiments, at least one L is O—C(=O)—$NR^2R$. In some embodiments, at least one L is $NR^3C$(=O)—$NR^2R$. In some embodiments of the present invention comprising a compound of formula (I), each R is, independently, H, methyl, ethyl, n-propyl, isopropyl, n-butyl, t-butyl, cyclohexyl, phenyl, tolyl, trichlorophenyl, chlorophenyl, bromophenyl, iodophenyl, hydroxyethyl, hydroxypropyl, dichlorophenyl, benzyl, chlorotolyl, naphthylethyl, nitrophenyl, dinitrophenyl, trinitrophenyl, trifluoromethyl, dinitro, 3,5-dimethylphenyl, or adamantyl. In other embodiments, each R is, independently, isopropyl, tert-butyl, xylyl, dichlorophenyl, 3,5-dimethylphenyl, or naphthylethyl.

In some embodiments of the present invention comprising a compound of Formula (I), each $R^1$ is, independently, hydroxypropyl, hydroxyethyl, methyl, trichloromethyl, trifluoromethyl, chloro, bromo, or iodo.

Cyclofructan refers to a cycloinulo-oligosaccharide consisting of six or more β-(2→1) linked D-fructofuranose units.

Derivatized cyclofructan, derivatized-cyclofructan, or functionalized cyclofructan as used herein refers to a cyclofructan in which one or more hydroxy groups have been replaced with other functional groups. Typically 2 to 18 hydroxy groups are replaced with other functional groups in a derivatized or functionalized cyclofructan 6, CF6, of the present invention. In a derivatized or functionalized cyclofructan 7, CF7, of this invention, 2 to 21 hydroxy groups are replaced with other functional groups. Typically 2 to 24 hydroxy groups are replaced with other functional groups in a derivatized or functionalized cyclofructan 8, CF8, of the present invention. Underivatized cyclofructan or native cyclofructan refers to a cyclofructan in which none hydroxy groups have been replaced by different functional groups.

"Alkyl," as used herein, refers to an aliphatic hydrocarbon chain of 1 to about 20 carbon atoms, preferably 1 to about 10 carbon atoms, more preferably, 1 to about 6 carbon atoms, and even more preferably, 1 to about 4 carbon atoms and includes straight and branched chains such as methyl, ethyl, n-propyl, isopropyl, n-butyl, isobutyl, sec-butyl, t-butyl, n-pentyl, isopentyl, neo-pentyl, n-hexyl, and isohexyl. "Lower alkyl" refers to an alkyl having 1 to about 4 carbon atoms, where "alkyl" is as defined herein.

"Alkylenyl," as used herein, refers to a divalent alkyl group, where "alkyl" is as defined herein.

"Arylenyl," as used herein, refers to a divalent aryl group, where "aryl" is as defined herein.

"Aryl," as used herein, refers to an optionally substituted, mono-, di-, tri-, or other multicyclic aromatic ring system having from about 5 to about 50 carbon atoms (and all combinations and subcombinations of ranges and specific numbers of carbon atoms therein), with from about 6 to about 10 carbons being preferred. Non-limiting examples include, for example, phenyl, naphthyl, anthracenyl, phenanthrenyl, and 3,5-dimethylphenyl. Aryl may be optionally substituted with one or more $R^1$, as defined herein.

"Heteroaryl," as used herein, refers to an optionally substituted, mono-, di-, tri-, or other multicyclic aromatic ring system, including heterocyclic rings, that includes at least one, and preferably from 1 to about 4 sulfur, oxygen, or nitrogen heteroatom ring members. Heteroaryl groups can have, for example, from about 3 to about 50 carbon atoms (and all combinations and subcombinations of ranges and specific numbers of carbon atoms therein), with from about 4 to about 10 carbons being preferred. Non-limiting examples of heteroaryl groups include, for example, pyriyl, furyl, pyridyl, 1,2,4-thiadiazolyl, pyrimidyl, thienyl, isothiazolyl, imidazolyl, tetrazolyl, pyrazinyl, pyrimidyl, quinolyl, isoquinolyl, thiophenyl, benzothienyl, isobenzofuryl, pyrazolyl, indolyl, purinyl, carbazolyl, benzimidazolyl, and isoxazolyl. Heteroaryl may be optionally substituted with one or more $R^1$, as defined herein.

"Heterocyclic ring," as used herein, refers to a stable 5- to 7-membered monocyclic or bicyclic or 7- to 10-membered bicyclic heterocyclic ring that is saturated, partially unsaturated or unsaturated (aromatic), and which contains carbon atoms and from 1 to 4 heteroatoms independently selected from the group consisting of N, O and S and including any bicyclic group in which any of the above defined heterocyclic rings is fused to a benzene ring. The nitrogen and sulfur heteroatoms may optionally be oxidized. The heterocyclic ring may be attached to its pendant group at any heteroatom or carbon atom that results in a stable structure. The heterocyclic rings described herein may be substituted on carbon or on a nitrogen atom if the resulting compound is stable. If specifically noted, a nitrogen atom in the heterocycle may optionally be quaternized. It is preferred that when the total number of S and O atoms in the heterocycle exceeds one, then these heteroatoms are not adjacent to one another. It is preferred that the total number of S and O atoms in the heterocycle is not more than one. Examples of heterocycles include, but are not limited to, 1H-indazole, 2-pyrrolidonyl, 2H,6H-1,5,2-dithiazinyl, 2H-pyrrolyl, 3H-indolyl, 4-piperidonyl, 4aH-carbazole, 4H-quinolizinyl, 6H-1,2,5-thiadiazinyl, acridinyl, azocinyl, benzimidazolyl, benzofuranyl, benzothiofuranyl, benzothiophenyl, benzoxazolyl, benzthiazolyl, benztriazolyl, benztetrazolyl, benzisoxazolyl, benzisothiazolyl, benzimidazalonyl, carbazolyl, 4H-carbazolyl, alpha-, beta-, or gamma-carbolinyl, chromanyl, chromenyl, cinnolinyl, decahydroquinolinyl, 2H, 6H-1,5,2dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, isobenzofuranyl, isochromanyl, isoindazolyl, isoindolinyl, isoindolyl, isoquinolinyl, isothiazolyl, isoxazolyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadia triazolyl, 1,3,4-triazolyl, xanthenyl. Preferred heterocycles include, but are not limited to, pyridinyl, furanyl, thienyl, pyrrolyl, pyrazolyl, imidazolyl, indolyl, benzimidazolyl, 1H-indazolyl, oxazolidinyl, benzotriazolyl, benzisoxazolyl, oxindolyl, benzoxazolinyl, or isatinoyl. Also included are fused ring and Spiro compounds containing, for example, the above heterocycles.

"Cycloalkyl," as used herein, refers to an optionally substituted, alkyl group having one or more rings in their structures having from 3 to about 20 carbon atoms (and all combinations and subcombinations of ranges and specific numbers of carbon atoms therein), with from 3 to about 10 carbon atoms being preferred. Multi-ring structures may be bridged or fused ring structures. Groups include, but are not limited to, cyclopropyl, cyclobutyl, cyclopentyl, cyclohexyl, cyclooctyl, 2-[4-isopropyl-1-methyl-7-oxa-bicyclo[2.2.1]heptanyl], 2-[1,2,3,4-tetrahydro-naphthalenyl], and adamantyl. Cycloalkyl may be optionally substituted with one or more $R^1$, as defined herein.

"Halo" or "halogen," as used herein, refers to chloro, bromo, fluoro, and iodo, or chlorine, bromine, fluorine, and iodine.

"Saccharide residue," as used herein, refers to a monosaccharide, disaccharide, oligosaccharide, or polysaccharide, or to a compound comprising a monosaccharide, disaccharide, oligosaccharide, or polysaccharide, wherein one or more hydroxy groups of the saccharide residue may optionally be replaced by different functional groups.

Cross-Linked Organic Polymer

Cross-linked organic polymer of the present invention is preferably styrene-based and/or (meth)acrylic-based polymer. The styrene-based polymer refers to a product of polymerization with mono-vinyl aromatic monomers and cross-linking monomers described herein. The (meth)acrylic-based co-polymer is a polymerization of (meth)acrylic monomers and cross-linking monomers, also described herein. The term (meth)acrylic monomers means acrylic monomers and/or methacrylic monomers.

The cross-linked organic polymer is not an inorganic carrier. More specifically, the cross-linked organic polymer of the present invention is not a silica, alumina, magnesia, glass, kaolin, titanium dioxide, a silicate or a hydroxyapatite carrier/support material.

Mono-vinyl aromatic monomers herein include, but not limited to, styrene, hydroxy styrene, halogenated styrene, such as bromostyrene, p/m-chlorostyrene, alkyl substituted styrene, such as methylstyrene, ethylstyrene, and p-methyl-α-methystyrene, and cycloalkyl styrene, such as naphthylstyrene and phenylstyrene. Others can be alkyl styrene optionally substituted with halo, such as chloromethylstyrene and bromomethylstyrene, alkyl styrene optionally substituted with alcoxyl, such as m/p-tert-butoxystyrene and p-methoxystyrene, and p-vinylbenzoic acid. While one or more of these monomers can be used for polymerization, styrene and ethyl styrene is particularly favored since it has shown suitable chromatographic performance.

(Meth)acrylic monomers herein include, but not limited to, (meth)acrylate, alkyl (meth)acrylate, such as methyl (meth)acrylate, ethyl (meth)acryate, n-propyl (meth)acrylate, iso-propyl (meth)acrylate, iso-butyl (meth)acrylate, t-butyl (meth)acrylate, and n-butyl (meth)acrylate, hydroxyethyl (meth)acrylate, hydroxypropyl (meth)acrylate, butyl (meth)acrylate, benzyl (meth)acrylate allyl(meth)acrylate, lauryl (meth)acrylate, 2-ethylhexyl (meth)acryate, cyclohexyl (meth)acrylate, methoxyethyl (meth)acrylate, ethoxyethyl (meth)acrylate, butoxyethyl (meth)acrylate, glycidyl (meth) acrylate, glycolmono (meth)acrylate, stearyl (meth)acrylate, tridecyl (meth)acrylate, methoxyethyl (meth)acrylate, ethoxyethyl (meth)acrylate, butoxyethyl (meth)acrylate, methoxypolyethyleneglycol (meth)acrylate, 2-hydroxyethyl (meth)acrylate, 2-hydroxypropyl (meth)acrylate, 2-hydroxy-3-chloropropyl (meth)acrylate, tetrahydrofurfuryl (meth)acrylate, dimethylaminoethylmethylchloride (meth)acrylate, dimethylaminoethyl (meth)acrylate, diethylaminoethyl (meth)acrylate, 2-chloroethyl (meth)acrylate, 2,3-dibromopropyl (meth)acrylate, tribromophenyl (meth)acrylate, oleyl (meth)acrylate, polyethylene glycol di(meth)acrylate, 1,3-butylene glycol di(meth)acrylate, hexaneglycol di(meth)acrylate, neopentylglycol di(meth)acrylate, dipropyleneglycol di(meth)acrylate, trimethylolpropane tri(meth)acrylate, tetramethylolmethane tri(meth)acrylate, 2-methyl-3-sulfopropylacryl (meth)amide, (meth)acrylate optionally substituted with amide, such as (meth)acrylamide, di(meth)acrylamide, hydroxyethyl (meth)acrylamide, (meth)acrylate optionally substituted with nitrile, such as (meth)acrylonitrile, and (meth)acrylate optionally substituted with epoxy, such as glycidol (meth)acrylate, epoxybutyl (meth)acrylate, and epoxystearyl (meth)acrylate.

Cross-linking monomers herein can be aromatic vinyl monomers, such as divinylbenzene, trivinylbenzene, divinyltoluene, divinylnaphtalene, divinylxylene, divinylbiphenyl, bis(vinylphenyl)methane, bis(vinylphenyl) ethane, bis(vinylphenyl)propane, and bis(vinylphenyl)butane, alkylene glycol di(meth)acrylate such as, polymethylene glycol di(meth)acrylate, polyethylene glycol di(meth)acrylate, ethylene glycol di(meth)acrylate, tetra-ethylene glycol di(meth)acrylate, triethylene glycol di(meth)acrylate, alkylene (meth)acrylate, N,N'-alkylenebis(meth)acrylamide, polyvalent (meth)acrylic compounds, such as trimethylol propanetri (meth)acrylate, polyvalent allyl compounds, such as triallyl isocyanurate, and diallyl phthalate. One or more of these cross-linking monomers can be used. In particular, divinylbenzene and ethylene glycol methacrylate are preferred.

Degree of Cross-Linkage

The term "degree of cross-linkage" refers to a percentage ratio of weight of the cross-linking monomers to total weight of mono-vinyl aromatic monomers, (meth)acrylic monomers, and the cross-linking monomers.

In the present invention, organic polymer preferably has degree of cross-linkage of more than 10 wt %. While there is no upper limit to the degree of cross-linkage, it is typically less than 90 wt %. The degree of cross-linkage of 25 to 70 wt % is more preferred. When the degree of cross-linkage is above lower limited values, particle properties, such as pore diameter, specific surface area, and pore volume, are more likely to be stable. This allows performing chromatographic evaluation in a difficult environment, such as high velocity of the mobile phase, without having deformations of the polymer particles.

Average Pore Diameter

In the present invention, the cross-linked organic polymer is preferably a porous cross-linked organic polymer. Preferably, the porous, cross-linked organic polymer has an average pore diameter of 2 to 300 nm, more preferably 5 to 250 nm. When the average pore diameter is more than the above lower limit values, an analyte flow rate can be increased during evaluation, leading to higher productivity. When pore size is less than the above upper limited values, mechanical strength of polymer particle is enhanced. This allows polymer for chromatographic separation to withstand high flow rates. The average pore diameter can, but not limited to, be measured by adsorption: a mercury porosimetry (Autopore-IV 9520, Shimazu) and/or a multipoint BET nitrogen adsorption method with equipments, such as Micromeritics sorption analyzer (model ASAP-2400).

Pore Volume

In the present invention, cross-linked organic polymer preferably has a pore volume of 0.1 to 3.0 ml/g, more preferably 0.3 to 2.0 ml/g. When pore volume is more than the above lower limited values, an analyte's flow rate can be increased during evaluation, which leads to higher productivity. When pore volume is less than the above upper limited values, mechanical strength of polymer particle is enhanced, which is likely to lead the polymer to withstand high flow rate during the evaluation.

The pore volume can, but not limited to, be measured by adsorption: a mercury porosimetry (Autopore-IV 9520, Shimazu) and/or a multipoint BET nitrogen adsorption method with equipments, such as Micromeritics sorption analyzer (model ASAP-2400).

Specific Surface Area

In the present invention, cross-linked organic polymer generally has a specific surface area of 10 to 1200 $m^2/g$, preferably 30 to 1000 $m^2/g$. When the specific surface area is more than the above lower limit values, an analyte's flow rate can be increased during evaluation, which leads to higher productivity. When the value of specific surface area is less than the above upper limit value, mechanical strength of polymer particle is enhanced, which likely to lead the polymer to withstand high flow rate during the evaluation.

The specific surface area can, but limited to, be measured by single point BET nitrogen adsorption method with equipments, such as Micromeritics sorption analyzer (model Flow-Sorb III 2305/2310).

Average Particle Diameter

In the present invention, cross-linked organic polymer generally has preferably an average particle diameter of 1 to 1000

µm, more preferably 5 to 500 µm. When average particle diameter is more than the above minimum value, it allows easier packing process. In addition, it enables chromatography evaluation with gradient elution with a constant flow rate of a mobile phase without sacrificing the analyte's flow rate. When the average particle diameter is less than the above upper limit value, separation efficiency is more likely to be increased.

When the average particle diameter is larger than 500 µm, a microscope can be used to determine the size. When the average particle diameter is between 2 and 500 µm, high-resolution 3-D sediment-sizing by the electrical sensing zone method (Multisizer 3 Coulter Counter, Beckman Coulter) can be used.

Polymerization of the mono-vinyl aromatic monomer and the cross-linking monomer described herein for the styrene-based polymer and of the (meth)acrylic monomers and cross-linking monomer described herein for the (meth)acrylic-based polymer are conducted, but not limited to, by publicly-known method of emulsion polymerization, suspension polymerization, and/or solution polymerization. Such examples are JP-A-6-262070, JP-A-64-54004, JP-A-58-58026, and JP-A-53-90911. To maintain the degree of cross-linkage within the limit specified herein, the weight of the cross-linking monomer is preferably more than 10% of the total weight of monomers, more preferably 25 to 70%, while there is no upper limit. Properties, such as the average pore diameter, specific surface area, and pore volume, can, but not limited to, be controlled in various ways. Controllable variables are, but not limited to, chemical structures of monomers, weight percentages of monomers to the cross-linking monomers, volume of organic solvents co-exist in polymerization reaction, and types of polymerization initiators.

Production of Chromatographic Separation Material

Chromatographic separation material of the present invention can be produced in a variety of ways. Production of such material includes, but not limited to, two methods: (i) immobilization of native or derivatized cyclofructans on cross-linked organic polymers and (ii) polymerization of native or derivatized cyclofructan-containing monomers.

The immobilization method can be conducted in various ways. In some embodiments of the present invention, a chromatographic separation material of the present invention is prepared by immobilizing or covalently bonding native cyclofructans to cross-linked organic polymers described herein. In some embodiments of the present invention, a chromatographic separation material with derivatized cyclofructans is prepared by immobilizing native cyclofructan to cross-linked organic polymer described herein and then derivatizing the native cyclofructan as described herein. In other embodiments of the present invention, a chromatographic separation material is prepared by first partially derivatizing a cyclofructan as described herein and then bonding said partially-derivatized cyclofructans to cross-linked organic polymers as described herein. In some embodiments of the present invention, after a partially derivatized cyclofructan is bonded to cross-linked organic polymers, it is further derivatized to achieve complete derivatization. In other embodiments of the present invention, after a partially derivatized cyclofructan is bonded to cross-linked organic polymer, it is functionalized with a different moiety in order to provide a heterogeneously derivatized cyclofructan. For illustration purpose, several procedures for making chromatographic separation materials of the present invention via immobilization are presented herein. A person of ordinary skill in the art would understand, however, that a similar procedure would allow preparation of such materials.

The linker between the compound of Formula (I) and the cross-linked organic polymer of the present invention is not an organosilane in that organosilanes do not function as effective or stable linkers between the compound of Formula (I) and the cross-linked organic polymer.

Suitable linking chemistry between the compound of Formula (I) (CF) and the cross-linked organic polymer (polymer) are one or more of the following reactions:

(1) an epoxy group of the polymer and a hydroxy group of the CF to form an ether linker;
(2) a halo group of the polymer and a hydroxy group of the CF to form an ether linker;
(3) a carboxy group of polymer and a hydroxy group of the CF to form an ester linker;
(4) a carboxyl or sulfonyl group of the polymer and a hydroxy group of the CF to form an ester linker;
(5) a hydroxy or amino group of the polymer and a hydroxy group of the CF with a diisocyanate to from a carbamate linker;
(6) an amino group of the polymer and a hydroxy group of the CF to form an amino linker;
(7) an epoxy group of the polymer and a tosylated CF to form an amino linker;
(8) an amino group of the polymer and a tosylated CF to form and amino linker;
(10) an azide group of the polymer and an alkyne group of the CF to form a 1,2,3-triazole linker;
(11) an alkyne group of the polymer and an azide group of the CF to form a 1,2,3-triazole linker.

Immobilization Via an Ether Linker

Figure 7:
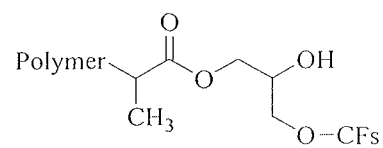
FIGS. 7-15 illustrate different linkers between the cyclofructan and the cross-linked, organic polymer.

In some embodiments of the present invention, a chromatographic separation material of compound of Formula (I) with an ether linker is described. Synthesis includes, but not limited to, reaction of epoxy group of cross-linked organic polymers and hydroxy group of cyclofructans. Polymer with epoxy group includes, but not limited to, product of publically known suspension polymerization of (meth)acrylic monomer, glycidylmethacrylate, styrene monomer, ethylstyrene, and cross-linking monomer, divinylbenzene, as method described herein. Polymers can also be functionalized with epoxy group prior to immobilization. Using polymer with epoxy group, immobilization includes, but not limited to, a ring opening of the epoxy group to connect with cyclofructan under one or more catalysts, such as sodium hydride, sodium hydroxide, sulfuric acid, hydrochloride, and/or aluminum chloride at 25-150° C. for 1 to 24 hours. The final product is collected after filteration, washing, and drying in vacuo. The procedures for chemically bonding native cyclofructans are essentially the same as those for bonding various derivatized cyclofructans. FIG. 7 illustrates this first ether linker between the CF and the cross-linked, organic polymer, wherein the polymer resin support was cross-linked glycidylmethacrylate-ethylstyrene-divinylbenzene copolymer (particle size is ~10 µm; pore size: 190 Å).

Figure 8:

Another synthesis includes, but not limited to, reaction of halo groups of cross-linked organic polymers with cyclofructans. Reagents used for this immobilization includes, such as sodium hydroxide or sodium hydride at 25 to 120° C. for 1 to 24 hours. The cross-linked polymers can be produced by chloromethylated suspension polymerization of styrene monomer, styrene, and cross-linking monomer, divinylbenzene, as method described herein. Toluene or dimethylformamide are the common solvents used for immobilization of cyclofructans to halo-polymers. The reactions are carried out at 25 to 120° C. for 1 to 24 hours. The final products are collected after filtration, washing, and drying for collection. It is claimed that the procedure also can be used to immobilize derivatized cyclofructans to such polymers. FIG. 8 illustrates this second ether linker between the CF and the cross-linked, organic polymer, wherein the polymer resin support was cross-linked chloromethylstyrene-ethylstyrene-divinylbenzene copolymer (particle size is ~10 µm; pore size: 170 Å).

Scheme 1 provides an example of synthesis of cross-linked organic polymer with cyclofructan via an ether linkage.

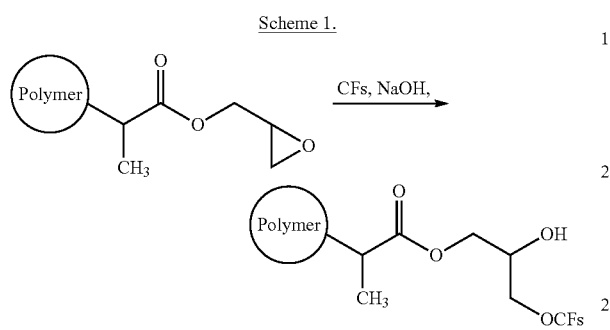

Scheme 1.

Immobilization Via an Ester Linker

Figure 9:
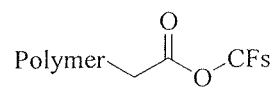

In some embodiments of the present invention, a chromatographic separation material of a compound of formula (I) with an ester linker is described. Synthesis includes, but not limited to, reaction of carboxy group of cross-linked organic polymer with hydroxy group of cyclofructans. Polymer with carboxy group includes, but not limited to, product of publically known suspension polymerization of (meth)acrylic monomer, methyl acrylate and acrylonitrile, and cross-linking monomer, divinylbenzene, as method described herein. Polymer can also be functionalized with carboxy group prior to immobilization. Using polymers with carboxy group, immobilization includes, but not limited to, dehydration reactions of the carboxy group with cyclofructans via dehydration by chemical reagent, such as lithium hydroxide at 25-150° C. for 1 to 24 hours. The final product is collected after filtered, washed, and dried in vacuo. The procedure also can be used to immobilize derivatized cyclofructans to such polymers. FIG. 9 illustrates this first ester linker between the CF and the cross-linked, organic polymer, wherein the polymer resin support was partially carboxymethylated glycidylmethacrylate-ethylstyrene-divinylbenzene copolymer (particle size is ~10 µm).

Figure 10:
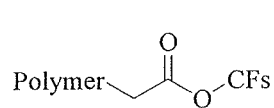
Figure 10:
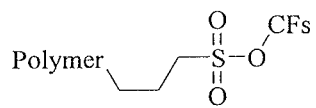

Another synthesis method includes, but not limited to use thionyl chloride. Synthesis includes, but not limited to, reaction of carboxyl or sulfonyl groups of polymers with thionyl chloride prior to immobilizing cyclofructans. Polymer with carboxy or sulfonyl groups includes, but not limited to, carboxymethylated or sulfopropylated product of publically known suspension polymerization of (meth)acrylic monomer, glycidylmethacrylate, styrene monomer, ethylstyrene, and cross-linking monomer, divinylbenzene, as method described herein. The polymer can, but not limited to, react with thionyl chloride in a solvent, such as anhydrous dimethylformamide at 25 to 120° C. for 0.5 to 36 hours, followed by addition to cyclofructan to deliver the separation materials. An addition of sodium hydride is an optional as a catalyst. The final product can be collected after filtration, washing, and drying in vacuo. Note that the procedures for chemically bonding native cyclofructans are essentially the same as those for bonding various derivatized cyclofructans. FIG. 10 illustrates this second ester linker between the CF and the cross-linked, organic polymer, wherein the polymer resin support were either partially carboxymethylated glycidylmethacrylate-ethylstyrene-divinylbenzene copolymer (particle size is ~10 µm) or partially 3-sulfopropylated glycidylmethacrylate-ethylstyrene-divinylbenzene copolymer (particle size is ~10 µm).

Scheme 2 provides an example of synthesis of cross-linked organic polymer with cyclofructan via an ester linkage.

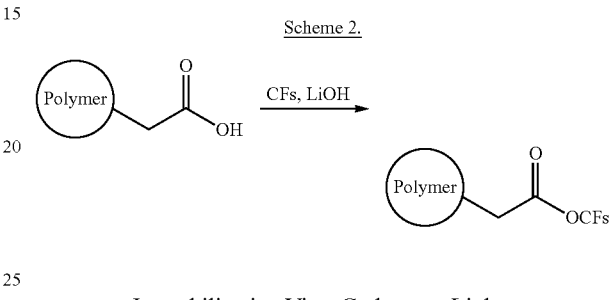

Scheme 2.

Immobilization Via a Carbamate Linker

Figure 11:
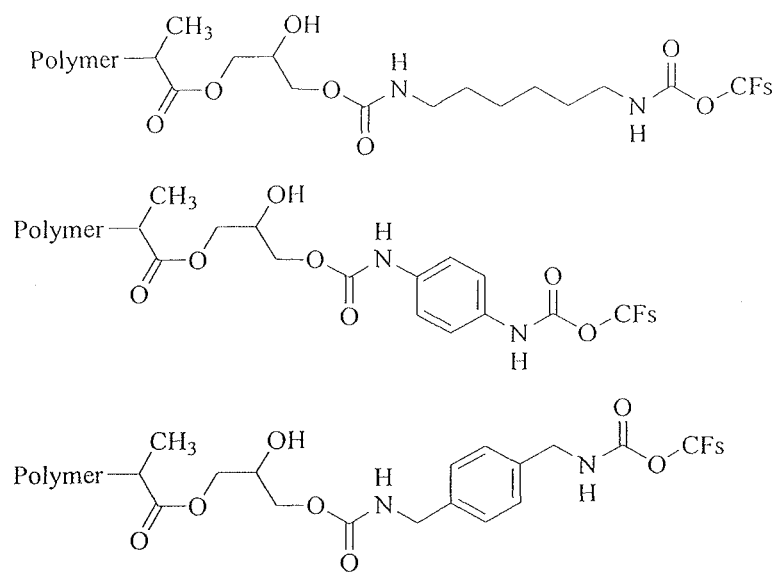

In some embodiments of the present invention, a chromatographic separation material of compound of Formula (I) with a carbamate linker is described. Synthesis includes, but not limited to, at least two ways. First method includes, but not limited to, connecting hydroxy or amino groups of a cross-linked organic polymer with hydroxy group of cyclofructans via carbamate linkage with diisocyanate reagents. Polymers with hydroxy or amino groups include, but not limited to, hydrolyzed produced by suspension polymerization of (meth) acrylic monomer, glycidylmethacrylate and cross-linking monomer, ethylene glycol dimethacrylate, as method described herein. Polymers can also be functionalized with hydroxy or amino groups prior to immobilization. Using polymer with hydroxy or amino groups, immobilization includes, but not limited to, reactions of cyclofructan with the polymers via di-carbamate linkers, such as 1,6-diisocyanatohexane, 4,4'-methylenediphenyl diisocyanate, and 1,4-phenylene diisocyanate, at 25 to 120° C. for 1 to 12 hours. FIG. 11 illustrates this first carbamate linker between the CF and the cross-linked, organic polymer, wherein the polymer resin support was cross-linked glycidylmethacrylate-ethylstyrene-divinylbenzene copolymer (particle size is ~10 µm; pore size: 300 Å).

Scheme 3 provides an example of synthesis of cross-linked organic polymer with cyclofructan via carbamate linkage.

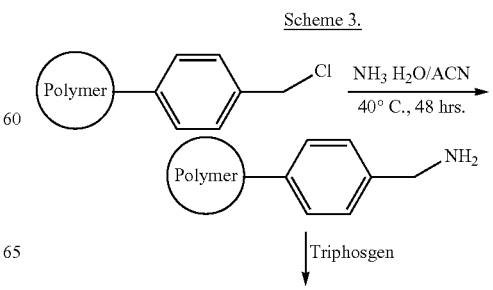

Scheme 3.

-continued

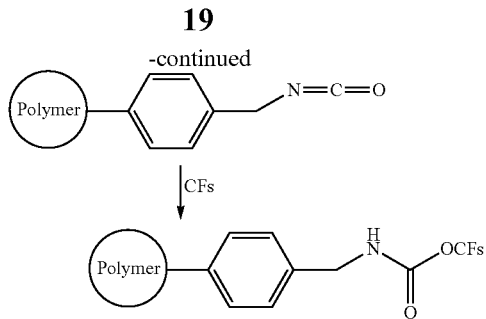

Immobilization Via an Amino Linker

Figure 12:
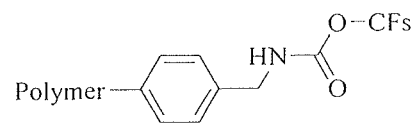

In some embodiments of the present invention, a chromatographic separation material of a compound of Formula (I) with a linker comprised of amino group is described. Synthesis includes, but not limited to, at least three ways. First method includes, but not limited to, connecting amino group of a cross-linked organic polymer with hydroxy group of cyclofructans. Polymer with amino group includes, but not limited to, amylated product of publically known suspension polymerization of (meth)acrylic monomer, glycidylmethacrylate and cross-linking monomer, ethylene glycol dimethacrylate, as method described herein. Polymer without amine group can also be functionalized with amine group prior to immobilization. Functionalization of polymers with amino group includes, but not limited to reactions of ammonium solution with chloromethylated polymer at 25 to 150° C. for 5 to 50 hours. Using polymer with amine groups, immobilization includes, but not limited to, reaction of the polymers with cyclofructans via p-nitrophenylchloroformate at 25 to 120° C. for 3 to 24 hours. The final product can be filtered, washed, and dried in vacuo for collection. Note that the procedures for chemically bonding native cyclofructans are essentially the same as those for bonding various derivatized cyclofructans. FIG. 12 illustrates this first amino linker between the CF and the cross-linked, organic polymer, wherein the polymer resin support was cross-linked chloromethylstyrene-ethylstyrene-divinylbenzene copolymer (particle size is ~10 µm; pore size: 170 Å).

Scheme 4 provides an example of synthesis of cross-linked organic polymer with cyclofructan via an amino linker.

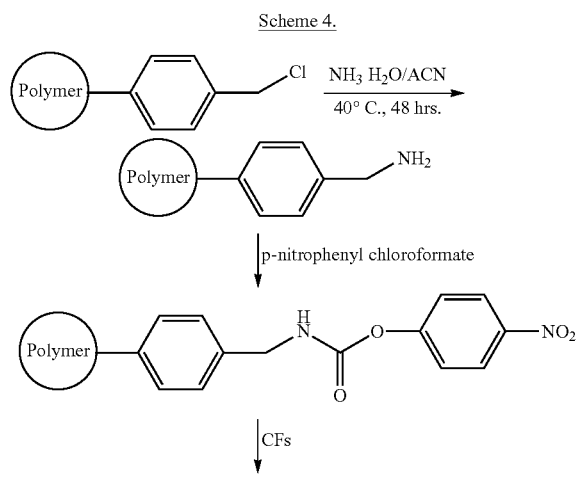

Scheme 4.

Figure 13:
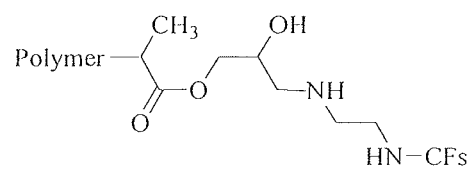

Alternatively, the second method includes, but not limited to, connecting cross-linked organic polymers with tosylated cyclofructans. Synthesis of tosylated cyclofructan is described in present invention and the tosylated functional group can be converted into amino group underusing ethylenediamine at 25 to 100° C. for 1 to 24 hours. The functionalized cyclofructans can be then reacted with polymer with epoxy functional group at 25 to 100° C. for 1 to 24 hours for immobilization. The final product is collected after filteration and drying in vacuo. Note that the procedures for chemically bonding native cyclofructans are essentially the same as those for bonding various derivatized cyclofructans. FIG. 13 illustrates this second amino linker between the CF and the cross-linked, organic polymer, wherein the polymer resin support was cross-linked glycidylmethacrylate-ethylstyrene-divinylbenzene copolymer (particle size is ~10 µm; pore size: 190 Å).

Figure 14:
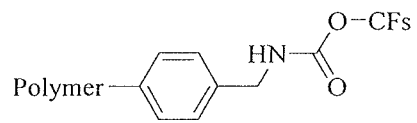

The third method includes, but not limited to, a method similar to the second method described above. The tosylated cyclofructans can react with amino functionalized polymers, such as products of reaction of ammonium hydroxide and cross-linked polymers at 25 to 100° C. for 3 to 50 hours. The cross-linked polymers can be produced by chloromethylated suspension polymerization of styrene monomer, styrene, and cross-linking monomer, divinylbenzene, as method described herein. The final product is collected after filteration and drying in vacuo. Note that the procedures for chemically bonding native cyclofructans are essentially the same as those for bonding various derivatized cyclofructans. FIG. 14 illustrates this third amino linker between the CF and the cross-linked, organic polymer, wherein the polymer resin support was cross-linked chloromethylstyrene-ethylstyrene-divinylbenzene copolymer (particle size is 10 µm).

Immobilization Via a 1,2,3-Triazole Linker

In some embodiments of the present invention, a chromatographic separation material of compound of Formula (I) with 1,2,3-triazole linker is described. Synthesis includes, but not limited to, two types of 1,3-dipolar cycloaddition reactions of azides and alkynes to immobilize underivatized and derivatized cyclofructans to cross-linked polymer.

Figure 15:
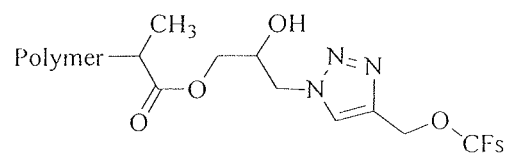

In some embodiments of the present invention, polymer can be modified with azide functional groups, while the cyclofructans are derivatized with alkynes. This case involves cyclofructans reacting with propargyl bromide with sodium hydride for 0.5 to 12 hours to provide alkyne substituted cyclofructans. Then alkyne substituted cyclofructans are immobilized to azided polymers. The cross-linked polymers can be produced by chloromethylated suspension polymerization of styrene monomer, styrene, and cross-linking monomer, divinylbenzene, as method described herein. The final products are collected after filtration and drying. FIG. 15 illustrates this first triazole linker between the CF and the cross-linked, organic polymer, wherein the polymer resin support was cross-linked glycidylmethacrylate-ethylstyrene-divinylbenzene copolymer (particle size is ~10 µm).

Scheme 5 provides examples of synthesis of cross-linked organic polymer with cyclofructan via 1,2,3-triazole Linker.

Scheme 5.

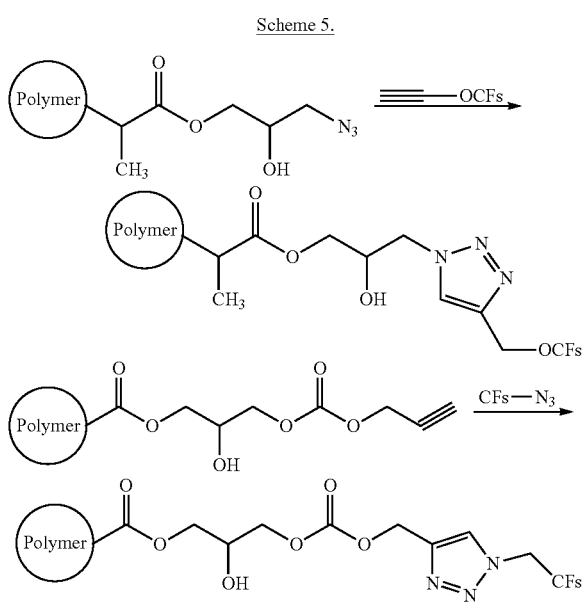

Figure 16:
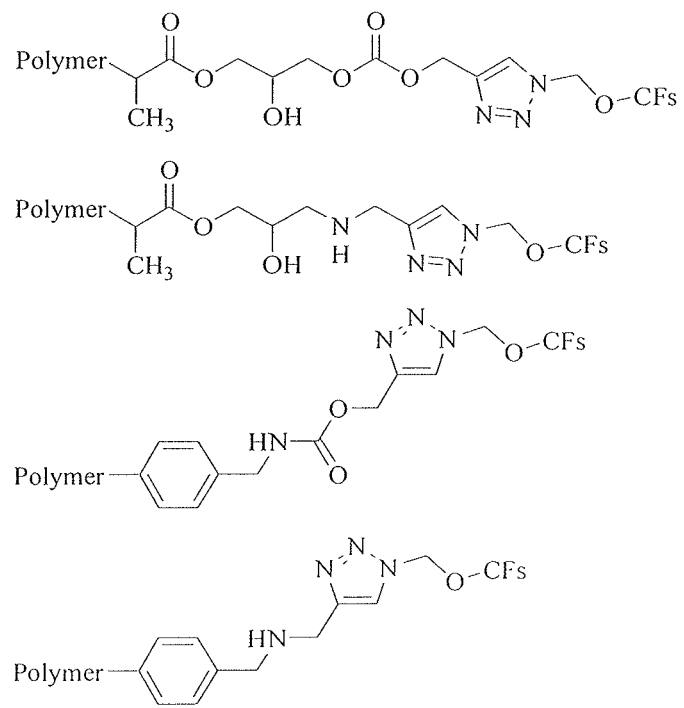
FIGS. 16-21 illustrate the separation material of the present invention as made in Examples 1-1 to 1-4, 2-1 and 2-2.

In other embodiments, the polymer can be modified with alkynes, while the cyclofructans are derivatized with azide functional group. This case involves tosylation of cyclofructans by reacting cyclofructans with p-toluenesulfonyl chloride in pyridine at 0 to 120° C. for 0.5 to 24 hours. Then the tosylated cyclofructans are reacted with sodium azide at 0 to 120° C. for 0.5 to 12 hours to form azide cyclofructans. Consequently, azide cyclofructans can be immobilized to alkyne functionalized polymers. The cross-linked polymers can be produced by chloromethylated suspension polymerization of styrene monomer, styrene, and cross-linking monomer, divinylbenzene, as method described herein. The final products are collected after filtration and drying in vacuo. The immobilization reactions are carried out at 0 to 120° C. for 0.5 to 120 hours with copper (I) catalyst. The final products are collected after filteration and dried in vacuo. FIG. 16 illustrates this second triazole linker between the CF and the cross-linked, organic polymer, wherein the polymer resin support were either cross-linked glycidylmethacrylate-ethylstyrene-divinylbenzene copolymer (particle size is ~10 μm) or cross-linked chloromethylstyrene-ethylstyrene-divinylbenzene copolymer (particle size is ~10 μm).

Note that the procedures for chemically bonding native cyclofructans are essentially the same as those for bonding various derivatized cyclofructans.

Polymerization of Cyclofructan-Containing Monomer

The polymerization of native or derivatized cyclofructan-containing monomers can be conducted in a variety of ways. In some embodiments of the present invention, a chromatographic separation material said native cyclofructans containing cross-linked organic polymers is prepared by polymering native or derivatized cyclofructans containing monomers and cross-linking monomer described herein. In some embodiments of the present invention, a chromatographic separation material said derivatized cyclofructan containing cross-linked organic polymer is prepared by polymerizing a native cyclofructan containing monomer and cross-linking monomer described herein and then optionally derivatizing the native cyclofructan as described herein. In other embodiments of the present invention, chromatographic separation material is prepared by first partially derivatizing cyclofructans as described herein and then polymerizing said partially-derivatized cyclofructan containing monomers and cross-linking monomers as described herein. In some embodiments of the present invention, after partially derivatized cyclofructans are polymerized with cross-linking monomer, it is further derivatized to complete derivatization. In other embodiments of the present invention, after a partially derivatized cyclofructan is polymerized with cross-linking monomer, it is functionalized with different moieties in order to provide heterogeneously derivatized cyclofructans. For illustration purpose, several procedures of production of chromatographic separation materials of the present invention via polymerization are presented herein. A person of ordinary skill in the art will understand, however, that a similar procedure would allow the preparation of such production.

Procedure of polymerization of native or derivatized cyclofructans containing monomers includes, but not limited to, the introduction of vinyl groups to the hydroxy group of cyclofructans. Cyclofructans and hydroquinone are dissolved in organic solvent, such as pyridine, and methacrylic anhydride is added to the solution. The mixture is heated usually at temperature of 25 to 100° C. for 1 to 24 hours. The monomer products are collected after precipitation, filteration and drying. The cyclofructan containing monomers can, but not limited to, be polymerized with one or more of the cross-linking monomers, such as ethylene glycol dimethacrylate to produce cross-linked organic polymers with suspension polymerization, publically known method described herein.

Derivatization of Cyclofructans

The procedures of derivatizing native or partially derivatized cyclofructan, native or partially derivatized cyclofructans containing cross-linked organic polymer, and native or partially derivatized cyclofructan containing monomer are essentially the same. For illustration purpose, several procedures of such derivatization are presented herein. A person of ordinary skill in the art will understand, however, that a similar procedure would allow the preparation of such production.

Halo Alkyl/Aryl Derivatized Cyclofructan

In some embodiments of the present invention, derivatization of native or partially cyclofructans with halo group is described. This includes, but not limited to, derivatization of cyclofructans, cyclofructan monomers, or cross-linked organic polymers comprised of cyclofructans with halo compounds, such as 4,6-di-O-pentyl-3-trifluoroacetyl, dichlorophenyl isocyanate, and 1-chloro-2,4-dinitrobenzene. Synthesis includes, but not limited to, an ice cold mixture of cyclofructan and anhydrous dimethylformamide, DMF, with finely ground sodium hydroxide and 1-bromopentane for 6 to 50 hours. As another synthesis method, 1-chloro-2,4-dinitrobenzene can react with cyclofructans when sodium hydride added in solvents, such as dimethylformamide, at 25-120° C. for 0.5 to 12 hours. Another synthesis includes, but not limited to, reactions of cyclofructans with isocyanate reagent, such as 3,5-bis(trifluoromethyl)phenyl isocyanate, 4-chlorophenyl isocyanate, 3,5-dichlorophenyl isocyanate at for 0.5 to 12 hours at ice-cold to 100° C. The product in solution can be precipitated and washed with solvents for collection to be further immobilized or bonded to monomer for polymerization.

Alkyl and/or Aryl Derivatized Cyclofructan

In some embodiments of the present invention, derivatization of native or partially derivatized cyclofructan, cyclofructan monomer, or cross-linked organic polymer immobilizing cyclofructan with alkyl group is described. This includes, but not limited to, derivatization of alkyl group, such as 3,4,6-tri-O-methyl and p-toluolyl. Synthesis includes, but not limited to reaction of sodium hydride, cyclofructans, and methyl iodide in solvent, such as dimethylsulfoxide (DMSO) for 0.5 to 12 hours at 0 to 100° θC, For tosylated cyclofructan may react with p-toluoyl sulfonyl chloride in a solvent, such as pyridine, at 0 to 120° θC. for 1 to 12 hours. The products are collected by precipitation, filtration, and drying. They are further immobilized or bonded to polymer and/or monomer for polymerization. Another includes, but not limited to derivation of alkyl group via isocyanate reagents. Synthesis includes, but not limited to, reactions of cyclofructans with isocyanate reagents, such as methyl isocyanate, ethyl isocyanate, isopropyl isocyanate, tert-butyl isocyanate, p-tolyl isocyanate, R-1-(1-naphthyl)ethyl isocyanate, S-1-(1-naphthyl) ethyl isocyanate, 4-methylphenyl isocyanate, 3,5-dimethylphenyl isocyanate, and S-α-ethylbenzyl isocyanate, at 25 to 120° θC. for 1 to 24 hours. The products in solution can be precipitated and washed with solvents for collection to be further immobilized or bonded to monomer for polymerization.

Sulfonated Cyclofructan

In some embodiments of the present invention, derivatization of native or partially derivatized cyclofructan, cyclofructan monomer, or cross-linked organic polymer immobilizing cyclofructan with sulfonate group is described. This includes, but not limited to, derivatization with sulfonate group, such as propylsulfonate. Synthesis includes, but not limited to, reaction of cyclofructan with sodium hydride at temperature of 25 to 100° C. for 3 to 12 hours, followed by an addition of 1,3-propane sultone for further reaction. The solution can be precipitate and washed with solvents for collection to be further immobilized or bonded to monomer for polymerization.

Tosylated Cyclofructan

In some embodiments of the present invention, derivatization of native or partially derivatized cyclofructan, cyclofructan monomer, or cross-linked organic polymer immobilizing cyclofructan with tosyl group is described. This includes, but not limited to, derivatization with tosyl agents, such as p-toluenesulfonyl chloride. Synthesis includes, but not limited to reactions of cyclofructans with p-toluenesulfonyl chloride in solvents, such as pyridine at 0 to 120° C. for 0.5 to 36 hours. The tosylation with p-toluenesulfonyl chloride and cyclofructans can also be conducted under potassium hydroxide in water and solvent such as tetrahydrofuran at 25 to 100° C. for 0.5 to 12 hours. The products in solution can be precipitated and washed with solvents for collection to be further immobilized or bonded to monomer for polymerization.

In the present invention, a compound of Formula (I) has a cyclofructan loading of 0.1 to 90 wt %, preferably 0.5 to 50 wt %, more preferably 5 to 40 wt %. The loading is defined as percentage ratio of weight of native and/or derivatized cyclofructans to total weight of chromatographic separation materials, the final product. The cyclofructan loading can, but not limited to, be measured by weight measurement, elemental analysis, and/or metal adsorption. For instance, weight difference between before and after the reaction of immobilization of native and/or derivatized cyclofructans allows measuring both the amount of cyclofructan loaded and total weight of chromatographic separation material to calculate cyclofructan loading. In case of co-polymerization of cross-linking monomer and native and/or derivatized cyclofructan containing monomer, the weight percentage used for the polymerization may be cyclofructan loading. When distinguished elements, such as amine group and/or halo group, are used to connect cyclofructan segments with cross-linked organic polymer material in the present invention, elemental analysis of before and after reaction for adequate elements, such as nitrogen, chromo, bromo, fluoro, in addition to hydrogen, oxygen, and carbon, allows calculating cyclofructan loading. Adsorption of metals, preferably alkali metals, such as sodium, potassium, rubidium, and cesium, can be used to measure cyclofructan loading. This may be preceded by metal adsorption of chromatographic separation material in present invention followed by titration of the metal ions. For instance, a chromatographic separation material described in present invention may be placed in a bath of diluted solution, 0.001 to 0.5 mM potassium permanganate. After 1 to 36 hours at room temperature, the top layer is collected for titration to calculate potassium adsorbed to calculating cyclofructan loading, assuming ratio of 1:1 for potassium and cyclofructan complex.

Application

In embodiments of the present invention comprising methods of chromatographic separation, said chromatographic separation is carried out by any methods not inconsistent with the object of the present invention. In some embodiments of the present invention comprising methods of chromatographic separation, said chromatographic separation is carried out by high pressure liquid chromatography (HPLC). In other embodiments of the present invention comprising methods of chromatographic separation, said chromatographic separation is carried out by gas liquid chromatography. In still other embodiments of the present invention comprising methods of chromatographic separation, said chromatographic separation is carried out by capillary chromatography. In some embodiments of the present invention comprising methods of chromatographic separation, said chromatographic separation is carried out by packed column gas chromatography. In other embodiments of the present invention comprising methods of chromatographic separation, said chromatographic separation is carried out by supercritical fluid chromatography (SFC). In still other embodiments of the present invention comprising methods of chromatographic separation, said chromatographic separation is carried out by hydrophilic interaction liquid chromatography (HILIC). In preferred embodiments of the present invention comprising methods of chromatographic separation, said chromatographic separation is HILIC separation. Another preferred embodiments of the present invention comprising methods of chromatographic separation, said chromatographic separation is chiral separation to separate a racemic mixture or other mixture of stereoisomers.

In some embodiments of the present invention comprising methods of chromatographic separation, the method further comprises providing a mobile phase comprising at least one organic solvent or supercritical fluid. In some embodiments of the present invention comprising methods of chromatographic separation further comprising providing a mobile phase comprising at least one organic solvent or supercritical fluid, said organic solvent is a polar organic solvent.

Chromatographic separation material of the present invention can be used in various separations. In embodiments of the present invention comprising applications of a chromatographic separation material, said a chromatographic separation is hydrophilic interaction liquid chromatography (HILIC) separation. Another preferred embodiments of the present invention comprising methods of chromatographic separation, said a chromatographic separation is chiral separation to separate a racemic mixture or other mixture of stereoisomers.

A HILIC separation material is suitable for separating polar and hydrophilic compounds. It is a separation technique which employs an eluent containing a high content of water miscible organic solvent, such as acetonitrile, propanol, ethanol, methanol, tetrahydrofuran, and acetone, to promote hydrophilic interactions between the analyte and a hydrophilic stationary phase, as described in US 2010/0320373 A1.

A chiral separation material of the present invention is suitable for separating chiral chemical compounds.

Embodiments of the present invention comprising methods of chromatographic separation comprising providing, as a first chromatographic separation material, a compound of Formula (I) covalently bonded to a cross-linked organic polymer, can be useful for the separation of a wide array of analytes, including acids, bases, amino acid derivatives, primary amines, secondary amines, tertiary amines, and others. Some embodiments of the present invention are especially useful for the separation of a wide range of primary amines. Moreover, a chromatographic separation material of the present invention exhibits excellent stability toward common organic solvents, with no detrimental changes in column performance observed after more than 1000 injections. Further, native or derivatized cyclofructan containing separation material of the present invention can serve as stationary phases for both analytical and preparative scale chromatography.

EXAMPLES

Following specific, non-limiting examples describes some exemplary embodiments of the present invention. Examples provided herein are: example 1-1 to 1-4 and comparative example 1-1 for chiral separation materials and example 2-1 to 2-2 with comparative example 2-1 for HILIC separation materials. Some of the following examples refer to a specific CFs starting material or reagent, such as CF6; however, CF7 or CF8 could be substituted for CF6 without alternating or violating the principles of the present invention. Abbreviations used in the Examples are as follows:

CFn=cyclofructan n, where n=6, 7, and/or 8
IP=isopropyl
IPCFn=isopropyl carbamate functionalized CFn, where n=6, 7, and/or 8
AA=acetic acid
ACN=acetonitrile
MeOH=methanol
EtOH=ethanol
DMF=dimethylformamide
NaOH=sodium hydroxide
NaH=sodium hydride
TEA=triethylamine
TFA=trifluoroacetic acid
HEP=heptane
THF=tetrahydrofuran
EDTA=ethylenediaminetetraacetic acid
ESI-MS=electrospray ionization-mass spectroscopy

Example 1-1

Cross-Linked (Meth)Acrylic-Based Polymer

This example shows preparation and performance of cross-linked acrylic polymer comprised of derivatized cyclofructan.

Synthesis Method

In a 100 ml 3-neck flask, 1.2 g CF6 was dried at 110° C. in an oven for 6 hours. Then 30 ml anhydrous pyridine was added to dissolve CF6. Next, 0.5 ml of isopropyl isocyanate in 10 ml pyridine was added to the cyclofructan solution dropwise under dry nitrogen protection. The mixture was stirred and heated at 90° C. for 6-10 hours and left for cool down.

At the same time, 3.0 g of acrylic polymer was placed in a 300 ml 3-neck flask and dried at 50° C. in a vacuum oven for 6 hours. The polymer was 30 wt % cross-linked glycidymethacrylate-ethylene glycol dimethacrylate copolymer with the properties of 30 μm spherical diameter, 65 Å pore diameter, and 170 m$^2$/g specific surface area. Anhydrous toluene was added under dry nitrogen protection, and 0.2 g of aluminum chloride and 0.7 g of sodium hydride were added consecutively. Then cyclofructan mixture was poured into the polymer-toluene slurry and heated at 100° C. for 6 hours. Once it was cooled, the product was collected by filtration, washed with adequate solvents like MeOH and acetone and dried in a vacuum oven overnight, yielding cyclofructan loading of 21 to 33%. This separation material is illustrated in FIG. 16.

Preparation of Column 3.0 g the solid product obtained above was packed to an inner diameter 4.6 mm, 25 cm long, stainless-steel chromatography column.

Evaluation

The chromatography column was evaluated by HPLC (Model 1100, Agilent) for chiral separation. Chiral analytes of R-1-(1-naphthyl)ethylamine and S-1-(1-naphthylethyl) amine were used for evaluation using 254 nm of UV detection and mobile phase of 80% HEP, 20% EtOH, 0.1% TFA at a flow rate of 1.0 ml/min.

Result & Analysis

Chromatography result showed enantiomeric separation of R/S-(1-naphthylethyl) amine with selectivity of 1.12 with the retention time of S-1-(1-naphthyl)ethylamine being 9.2 min, which indicates chiral separation.

Example 1-2

Cross-Linked Styrene-Based Polymer

This example shows preparation and evaluation of chiral separation performance of styrene polymer-bonded derivatized cyclofructan. In particular, this example, as well as Example 1-3 and 1-4, shows that 1,3-dipolar cycloaddition reactions of azides with alkynes can be used to attach underivatized and derivatized cyclofructans to organic polymers. In some embodiments of the present invention, the polymer can be modified with azide groups, while the cyclofructan is derivatized with alkynes before a click chemistry reaction. In other embodiments, the polymer can be modified with alkynes, while the cyclofructan is derivatized with azide groups. In this example, for illustration purpose only, azide-modified styrene polymer reacts with alkyne-functionalized cyclofructan to afford the covalently bonded cyclofructan separation material.

Synthesis

Figure 17:
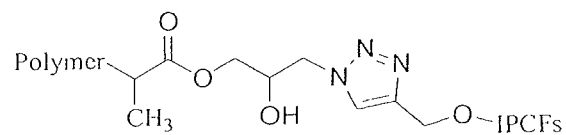

The synthesis method involves four steps: functionalization of polymer with azide group, preparation of IPCF6, preparation of propargyl IPCF6, and reaction of click chemistry between azide-polymer with propargyl CF6. For the first step, 13 g polymer was suspended in DMF/water 90/160 ml. The polymer was about 40 wt % cross-linked glycidymethacrylate-ethylenestyrene-divinylbenzene co-polymer with the properties of 10 μm spherical diameter, 40 nm pore diameter, and 300 m$^2$/g specific surface area with pore volume of 0.6 ml/g. 10 g sodium azide was added to the mixture and heated over 70° C. for 20 hours. Once it was cooled, the product was filtered and washed with solvents, such as DMF, water, methanol, THF, ACN and Acetone. After dried in vacuum overnight, the product indicated weight gain of 6.2 wt %. In the second step, CF6 was derivatized with isopropyl functional group by reacting 3 g CF6 with 0.5 ml of isopropyl isocyanate in pyridine at temperature of 70° C. for several hours to produce IPCF. As the third step, 6 g IPCF6 was placed in 100 ml 3-neck flask and dissolved in 20 ml DMF. 0.3 g NaH and 1.3 g propargyl bromide were added for reaction. After the reaction, the residue was washed with dichloromethane and dried in vacuo. The last step involved click chemistry. The propargyl-functionalized IPCF6 was placed to add 60 ml of ACN-MeOH mixture. 0.05 g Cu(I) acetate and 0.3 ml of 2,6-lutidine were added and stirred at 70° C. for several days. The product was collected after filtrated and washed with water, MeOH, EDTA solution, water, ACN, dichloromethane, acetone, then dried in vacuo oven for more than 12 hours, yielding cyclofructan loading of 14 wt %. This separation material is illustrated in FIG. 17, wherein the polymer resin support was cross-linked glycidylmethacrylate-ethylstyrene-divinylbenzene copolymer (particle size is ~10 μm).

Preparation of Column 3.0 g the solid product obtained above was packed to an inner diameter 4.6 mm, 25 cm long, stainless-steel chromatography column.

Evaluation

The chromatography column was evaluated by HPLC system (Model 1100, Agilent) for chiral separation. Chiral analytes included R-1-(1-naphthyl)ethylamine, S-1-(1-naphthyl)ethylamine, and a 50/50 mixture of R/S-1-(1-naphthyl)ethylamine using 254 nm of UV detection and mobile phase of 60 vol % ACN, 40 vol % MeOH, 0.3 vol % AA, and 0.2 vol % TEA at flow rate of 1.0 ml/min.

Result & Analysis

Enantiomeric separation performance resulted in a selectivity of 1.08 with a retention time of 6.2 min for S-1-(1-naphthyl)ethylamine, indicating chiral separation.

Example 1-3

Cross-Linked Styrene-Based Polymer

This example shows preparation and chiral separation performance of styrene polymer-bonded derivatized cyclofructan. In particular, this Example, as well as Example 4, shows that in some embodiments of the present invention, a cyclofructan can be first bonded to organic polymer and then later derivatized to form a polymer-bonded derivatized cyclofructan.

Synthesis

Figure 18:
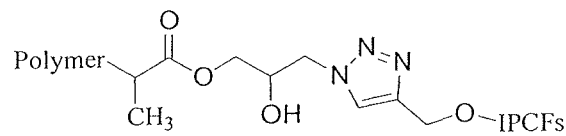

The synthesis method involves four steps: functionalization of polymer with azide group, preparation of propargyl CF6, reaction of click chemistry between azide-polymer with propargyl CF6, and derivatization of CF6 with IP. The synthesis was conducted in a similar manner as Example 1-2 except that the preparation of IPCF6 of the second step was altered to the last step for this procedure. Using the same polymer and first synthesis step as Example 1-2, polymer was functionalized with azide group. As a second step, 2 g CF6 was placed in 100 ml 3-neck flask and reaction took place as exactly the same condition was Example 1-2. In addition, the third step involving click chemistry was also conducted as Example 1-2 describes. The last step of derivatization was conducted by suspending 3 g the cross-linked polymer containing CF6 in 60 ml pyridine and 0.3 ml of isopropylisocyanate was added dropwise for reaction at 90° C. overnight. The final product was collected after filteration, washing with pyridine, MeOH, water, ACN, dichloromethane, and acetone, then drying in vacuo, which yielded cyclofructan with 10 wt % loading. This separation material is illustrated in FIG. 18, wherein the polymer resin support was cross-linked glycidylmethacrylate-ethylstyrene-divinylbenzene copolymer (particle size is ~10 μm).

Preparation of Column 3.0 g the solid product obtained above was packed to an inner diameter 4.6 mm, 25 cm long, stainless-steel chromatography column.

Evaluation

The chromatography column was evaluated by HPLC (Model 1100, Agilent) for chiral separation. A 50/50 mixture of R-1-(1-naphthyl)ethylamine and S-1-(1-naphthyl)ethylamine was used for evaluation with a mobile phase of 60% ACN, 40% MeOH, 0.3% AA, and 0.2% TEA at a flow rate of 1.0 ml/min with 254 nm UV detection.

Result & Analysis

Enantiomeric separation evaluation resulted in a selectivity of 1.33 with a retention time of 7.0 min of S-1-(1-naphthyl) ethylamine, indicating chiral separation.

Example 1-4

Cross-Linked Styrene-Based Polymer

This example shows preparation and chiral separation performance of chloromethylated styrene polymer-bonded derivatized cyclofructan.

Synthesis

Figure 19:
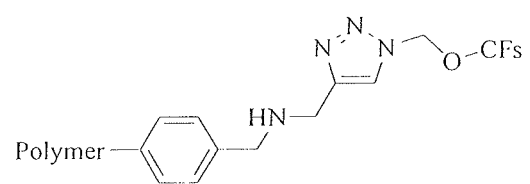

In a 300 ml 3-neck flask, 3 g polymer was suspended in 100 ml ACN and 50 ml 0.2 wt % NaOH solution. The polymer was about 35 wt % cross-linked chloromethylstyrene-ethylstyrene-divinylbenzene co-polymer with the properties of 10 μm spherical diameter, 34 nm pore diameter, and 420 $m^2$/g specific surface area with pore volume of 0.7 ml/g. About 3 ml propargyl amine was added and refluxed for 12 hours Once the mixture was cooled down, the product was collected by filtrated, washed with water, MeOH, ACN and acetone, then dried in vacuo overnight. At the same time, tosylated CF6 was prepared with a same manner described in US1978/4169079 (Tabushi, Shimizu, Yamamura). 5.0 g the tosylated CF6 was dissolved in water, and 3.0 g sodium azide was added, the reaction was refluxed. The reaction was monitored by ESI-MS until the reactant was consumed to produce azide CF6. The product was evaporated and purified. On a separate flask, 3.0 g previously prepared propargyl-polymer was suspended in a mixture of ACN and MeOH. 0.06 g Cu(I) acetate and 0.3 ml 2,6-lutidine was added to 3.0 g azide CF6 product to carry out the reaction. The product, azide CF6-propargyl-polymer, was washed with solvents and dried in vacuo overnight. The slurry solution was suspended in 60 ml pyridine and heated to 90° C. 0.3 ml isopropyl isocyanate was added and the reaction was stirred for 12 hours. The final product was collected by filtered, washed, and dried as specified herein, yielding cyclofructan with 13 wt % loading. This separation material is illustrated in FIG. 19, wherein the polymer resin support was cross-linked chloromethylstyrene-ethylstyrene-divinylbenzene copolymer (particle size is ~10 μm).

Preparation of Column 3.0 g the solid product obtained above was packed to an inner diameter 4.6 mm, 25 cm long, stainless-steel chromatography column.

Evaluation

The chromatography column was evaluated by HPLC (Model 1100, Agilent) for chiral separation. Separated analytes included 50/50 mixture of R/S or D/L isomers of trans 1-amino-2-indanol, Cis-1-amino-2-indanol, 2-amino-1,2-diphenylehtanol, 2-amino-1-(4-nitrophenyl)-1,3-propanediol, 1-aminoindan, 1-(1-naphthyl)ethylamine, 1-(2-naphthyl)ethylamine, α-(1-aminoethyl)-4-hydroxybenzyl alcohol hydrochloride, and phenylpropanolamine hydrochloride. These separations were performed at 254 nm UV detection with a mobile phase of solvent mixtures of ACN, MeOH, AA, and TEA, which compositions are listed in Table 1. The mobile phase was at flow rates of 1.0 ml/min.

Result & Analysis

Figure 2:
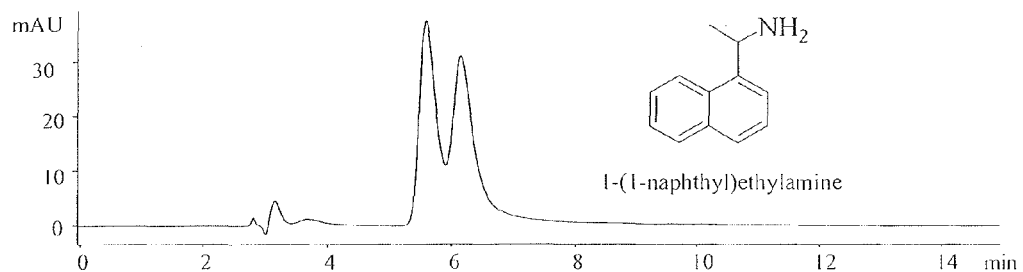
FIG. 2 illustrates separation of R/S-1-(1-naphthyl)ethylamine with the separation material of the present invention.

FIG. 2 shows a chromatogram depicting separation of R/S-1-(1-naphthyl)ethylamine with selectivity of 1.22 with a retention time of 0.87 min. Chiral separation performances of above mentioned compounds, including one from FIG. 2, are shown in Table 1 with selectivity and retention factor in min. The selectivity values above 1.00 indicate chiral

TABLE 1

| Analyte | $k_1$ | α | $R_s$ | Mobile phase (vol %) |
|---|---|---|---|---|
| Trans-1-Amino-2-indanol | 1.06 | 1.36 | 1.4 | 60/40/0.3/0.2 ACN/MeOH/AA/TEA |
| Cis-1-Amino-2-indanol | 0.87 | 1.20 | 1.0 | 60/40/0.3/0.2 ACN/MeOH/AA/TEA |
| 2-Amino-1,2-diphenylehtanol | 0.47 | 1.19 | 0.6 | 60/40/0.3/0.2 ACN/MeOH/AA/TEA |
| 2-Amino-1-(4-nitrophenyl)-1,3-propanediol | 2.00 | 1.13 | 0.6 | 70ACN30MeOH0.3AA0.2TEA |
| 1-Aminoindan | 0.78 | 1.22 | 0.9 | 60/40/0.3/0.2 ACN/MeOH/AA/TEA |
| 1-(1-Naphthyl)ethylamine | 0.87 | 1.22 | 1.0 | 60/40/0.3/0.2 ACN/MeOH/AA/TEA |
| 1-(2-Naphthyl)ethylamine | 0.96 | 1.09 | 0.4 | 60/40/0.3/0.2 ACN/MeOH/AA/TEA |
| α-(1-Aminoethyl)-4-hydroxybenzyl alcohol hydrochloride | 1.57 | 1.08 | 0.5 | 60/40/0.3/0.2 ACN/MeOH/AA/TEA |
| Phenylpropanolamine hydrochloride | 1.17 | 1.10 | 0.5 | 60/40/0.3/0.2 ACN/MeOH/AA/TEA |

$k_1$ is the retention factor for the 1st eluted enantiomer, $k_2$ is the retention factor for the 2nd eluted enantiomer. They are calculated as follows: $k_1=(t_1-t_o)/t_o$. The $t_o$ is the dead time of the column (i.e., the time it takes for a totally unretained peak to come out of the column).

Alpha (α) is the selectivity factor and is calculated as follows: alpha=k2/k1.

Rs is the resolution (between the two enantiomeric peaks). It is calculated as follows. $Rs=(t_2-t_1)/(w_1+w_2)$. The $w_1$ and $w_2$ are the baseline peak widths or the 1st and 2nd peaks respectively.

Comparative Example 1-1

Silica-Bonded Material

This example shows comparison between silica-bonded derivatized cyclofructan described in US2011/0024292 A1 and polymer-bonded derivatized cyclofructan described in this invention.

Synthesis

The separation material, LARIHC CF6-P, was prepared and the chromatographic column was packed by AZYP®. As US2011/0024292 A1 describes its synthesis, LARIHC CF6-P is silica-bonded derivatized cyclofructan.

Evaluation

The chromatography column was evaluated by HPLC (Model 1100, Agilent) for chiral separation. Separated analytes included 50/50 mixture of R/S or D/L isomers of trans-1-amino-2-indanol, Cis-1-amino-2-indanol, 1-aminoindan, and phenylpropanolamine hydrochloride. These separations were performed at 254 nm UV detection with a mobile phase of solvent mixtures of ACN, MeOH, AA, and TEA, which compositions are listed in Table 2. The mobile phase was at flow rates of 1.0 ml/min.

Result & Analysis

Table 2 shows separation performance of silica based IPCF6. Comparing both retention time and selectivity from the table with Example 4, Example 4 has shorter retention time with higher selectivity: polymer-based separation material offers higher efficiency and productivity, therefore, higher separation performance.

TABLE 2

Comparison of separation performance between silica-bonded IPCF6 (LARIHC CF6-P) and cross-linked polymer-bonded IPCF6. The symbols $\alpha$, and $k_1$ represent selectivity and retention factor consecutively.

| Analytes | Silica-bonded IPCF6 $k_1$ | A | Mobile phase (with vol % composition) |
|---|---|---|---|
| Trans-1-Amino-2-indanol | 2.85 | 1.31 | 60/40/0.3/0.2 ACN/MeOH/AA/TEA |
| Cis-1-Amino-2-indanol | 2.69 | 1.12 | 60/40/0.3/0.2 ACN/MeOH/AA/TEA |
| 1-Aminoindan | 3.90 | 1.17 | 60/40/0.3/0.2 ACN/MeOH/AA/TEA |
| Phenylpropanolamine hydrochloride | 1.44 | 1.10 | 60/40/0.3/0.2 ACN/MeOH/AA/TEA |

Example 2-1

Carboxymethylate Styrene Polymer-Bonded Cyclofructan

This example shows preparation and HILIC separation performance of chloromethylated styrene polymer-bonded cyclofructan.

Figure 20:
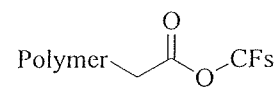
Figure 21:
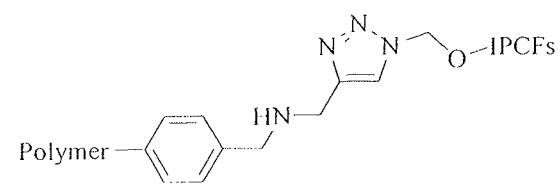

Synthesis 3.0 g polymer was suspended in 50 ml anhydrous toluene. Polymer was about 30 wt % cross-linked carboxymethylated co-polymer of glycidylmethacrylate-ethylstyrene-divinylbenzene co-polymer with the properties of 10 μm spherical diameter. 10 ml of thionyl chloride added dropwise with 20 ml DMF in 30 min. The reaction mixture was heated up to 50° C. for 4 hours, then cooled down and washed with anhydrous toluene. The fresh product was transferred into another 3-neck round flask and suspended in 50 ml anhydrous toluene and was added dropwise to the reaction mixture of 2.0 g cyclofructan dissolved in 40 ml DMF with 0.2 g NaH in ice-bath. The reaction was left in room temperature overnight. After washing with MeOH, water, and acetone, the product was dried in vacuum and yielded cyclofructan loading of 17 wt %, This separation material is illustrated in FIG. 20, wherein the polymer resin support was partially carboxymethylated glycidylmethacrylate-ethylstyrene-divinylbenzene copolymer (particle size is ~10 μm).

Preparation of Column 3.0 g the solid product obtained above was packed to an inner diameter 4.6 mm, 25 cm long, stainless-steel chromatography column.

Evaluation

The HILIC separation materials were evaluated by HPLC (Model 1100, Agilent) with RI detection for analytes of nucleosides and maltosides individually. The nucleoside separation was evaluated with mobile phase of 75% ACN and 25% water by volume at a flow rate of 1.0 ml/min. The maltosides separation was evaluated with mobile phase of 90 vol % ACN with 10 vol % 20 mM ammonium acetate of pH=4.1 at a flow rate of 1.0 ml/min. In both evaluations, the RI detection mode was used.

Result & Analysis

Figure 3:
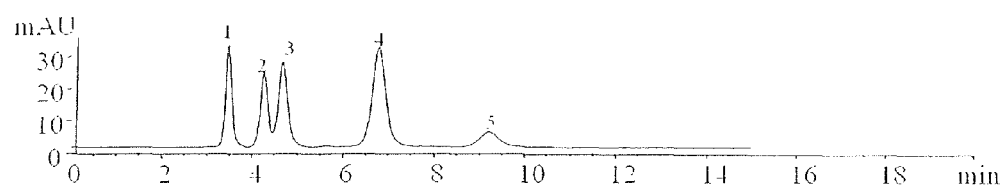
FIG. 3 illustrates HILIC separation of five nucleosides with the separation material of the present invention.
Figure 4:
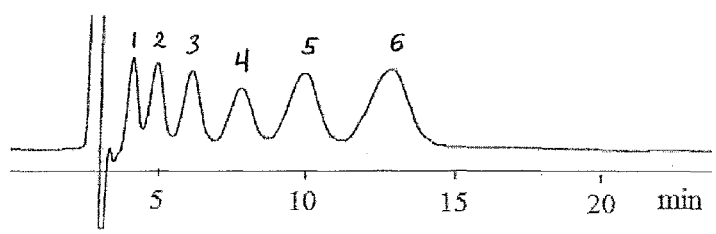
FIG. 4 illustrates HILIC separation of six maltosides with the separation material of the present invention.

Results are shown in FIG. 3 and in FIG. 4. The indications of individual peaks indicate excellent separation performance. The number of peaks in the chromatograms is the same as the number of analytes on both figures, and the peaks are not overlapped. This indicates successful synthesis of HILIC separation material.

In FIG. 3, the five nucleosides analytes were: 1: thymidine, 2; uradine, 3; adenosine, 4; cytidine, 5; guanosine.

In FIG. 4, the maltosides analytes were 1: maltose, 2: maltotriose, 3: maltotetraose, 4: maltopentaose, 5: maltohexaose, 6: maltoheptaose.

Example 2-2

Epoxy Functionalized Styrene Polymer-Bonded Cyclofructan

This example shows preparation and HILIC separation performance of epoxy functionalized styrene polymer-bonded cyclofructan.

Synthesis

The synthesis method involves three steps: functionalization of polymer with azide group, preparation of propargyl CF6, reaction of click chemistry of azide-polymer and propargyl CF6, and derivatization of CF6. Including polymer used in this procedure, procedures were same as Example 1-2, except that the last step of derivatization in Example 1-2 was not conducted. As following this procedure, the final product yielded cyclofructan loading of 9 wt %. This separation material is illustrated in FIG. 2*l*, wherein the polymer resin support was cross-linked chloromethylstyrene-ethylstyrene-divinylbenzene copolymer (particle size is 10 μm).

Preparation of Column 3.0 g the solid product obtained above was packed to an inner diameter 4.6 mm, 25 cm long, stainless-steel chromatography column.

Evaluation

The HILIC separation was evaluated by HPLC (Model 1100, Agilent) with CF6, 7, and 8 and mobile phase of 75 vol % ACN and 25 vol % water at a flow rate of 1.0 ml/min when RI detection was used.

Result & Analysis

Figure 5:
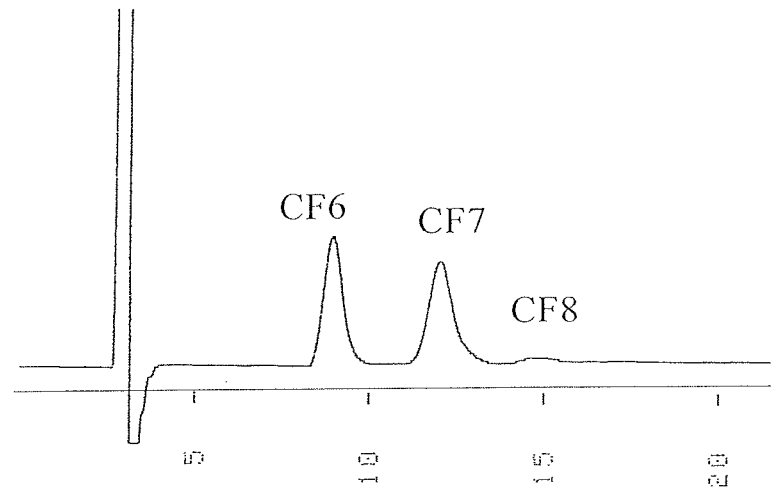
FIG. 5 illustrates HILIC separation of CF 6-8 with the separation material of the present invention.

The HILIC separation of CF6-8 is shown in FIG. 5. The elusion or retention time of CF6 was about 7 min. Having three separate peaks without any overlap indicates baseline separation and successful HILIC separation.

Comparable Example 2-1

Silica-Bonded Cyclofructan

This example shows silica-bonded cyclofructan in a HILIC separation process.

Synthesis

The chromatographic separation material, FRULIC-N, was prepared by AZYP®. The preparation method was described in US2011/0024292 A1 that FRULIC-N is silica-bonded native cyclofructan, CFs.

Evaluation

The HILIC separation was evaluated by HPLC (Model 1100, Agilent) with CF6, 7, and 8 as analytes and RI detector. Mobile phase of 78 vol % ACN and 22 vol % 20 mM ammonia acetate (pH=4.1) at flowrate of 1.0 ml/min.

Result & Analysis

Figure 6:
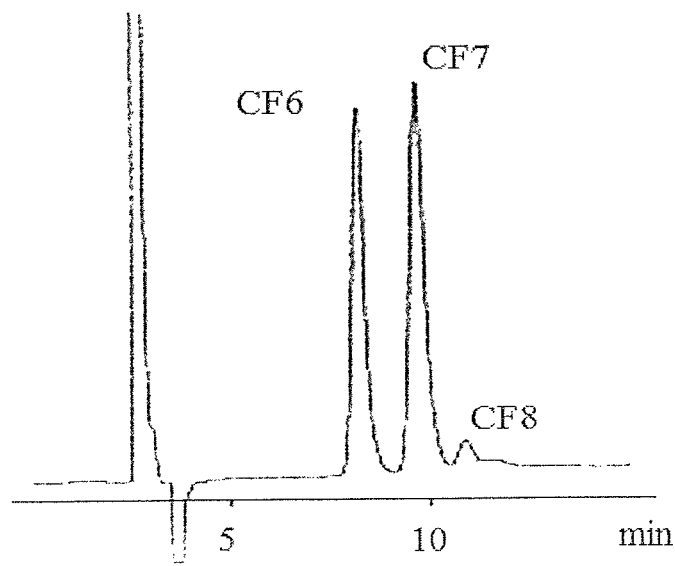
FIG. 6 illustrates HILIC separation of CF 6-8 with cyclofructan bonded to silica gel.

Result is shown in FIG. 6. The elusion or retention time of CF6 was about 15 minutes. Comparing this result with separation performance in Example 2-1, this separation has longer elusion or retention time: this indicates that silica-bonded derivatized cyclofructan has less productive separation performance.

Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention.

We claim:
1. A chromatographic separation material comprising:
a cross-linked, organic polymer particle, wherein the cross-linked organic polymer particle is a styrene-based cross-linked polymer and/or a (meth)acrylic-based polymer, and the weight of the cross-linking monomer is more than 10% of the total weight monomers; and
a cyclofructan compound of Formula (I):

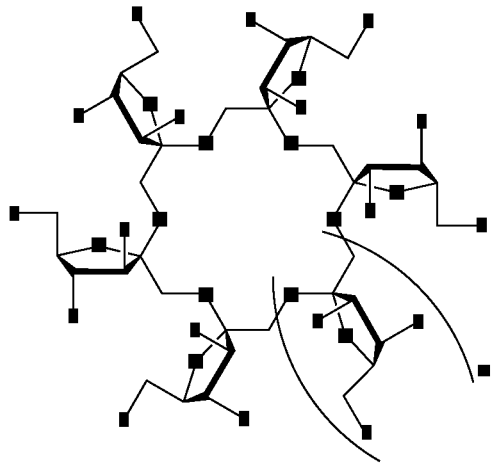

wherein:
n is 1-3;
each L is, independently,
OR,
$CR_3$,
$NR^2R$,
O—C(=O)—R,
O—C(=O)—$NR^2$—R,
$NR^3$C(=O)—$NR^2$R, or

substituted with R;
each R is, independently,
H,
($C_1$-$C_{20}$)alkyl group optionally substituted with 1-3 $R^1$,
($C_3$-$C_{20}$)cycloalkyl group optionally substituted with 1-3 $R^1$,
($C_5$-$C_{50}$)aryl group optionally substituted with 1-3 $R^1$,
heteroaryl group optionally substituted with 1-3 $R^1$,
($C_1$-$C_{20}$)alkoxy ($C_1$-$C_{20}$)alkyl group,
$H_2$C=CH—(when L is O—C(=O)—R),
$H_2$C=C($CH_3$)—(when L is O—C(=O)—R),
alkylenyl-N=C=O;
arylenyl-N=C=O;
—$SO_2R^5$ (when L is OR),
=$SO_3$ (when L is OR),
($C_5$-$C_{50}$)aryl($C_1$-$C_{20}$) alkyl group optionally substituted with 1-3 $R^1$, or saccharide residue lacking a hydroxy group (when L is OR), or a covalent bond to cross-linked organic polymer;
$R^1$ is, independently, ($C_1$-$C_{10}$)alkyl group optionally substituted with 1-3 $R^6$, halo group, hydroxy group, —$NR^3R^4$, —$COOR^2$, —$COR^2$, nitro group, trihaloalkyl group, or —Si($OR^2$)$_3$;
$R^2$ is, independently, H or ($C_1$-$C_{10}$)alkyl group;
$R^3$ is, independently, H or ($C_1$-$C_{10}$)alkyl group;
$R^4$ is, independently, H or ($C_1$-$C_{10}$)alkyl group;

R[5] is, independently, (C[1]-C[20])alkyl group optionally substituted with 1-3 R[1], (C[5]-C[50])aryl optionally substituted with 1-3 R[1], or heteroaryl optionally substituted with 1-3 R[1];

R[6] is, independently, halo group, hydroxyl group, —NR[3]R[4], —COOR[2], —COR[2], nitro group, trihaloalkyl group or —Si(OR[2])[3];

wherein at least one R is a covalent bond to the cross-linked organic polymer particle, and wherein the chromatographic separation material is selected from the group consisting of:

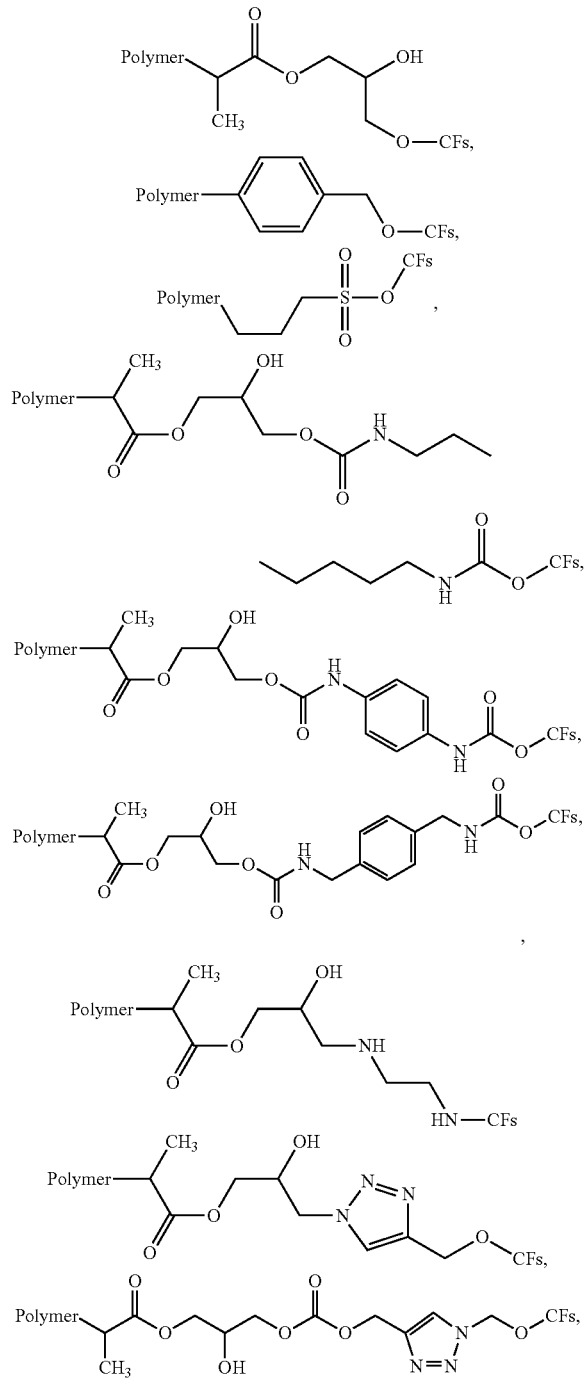

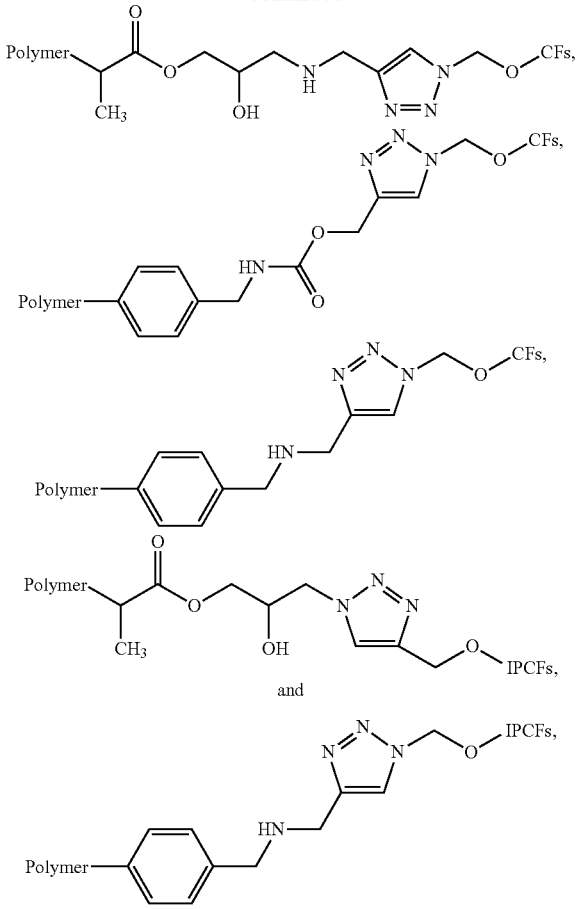

wherein Polymer is the cross-linked organic polymer particle, $CF_s$ is the cyclofructan compound of Formula (I) having 6, 7 or 8 fructose moieties, and IP is isopropyl.

2. The chromatographic separation material of claim 1, wherein the cross-linked organic polymer particle comprises a specific surface area of 10 to 1200 m²/g.

3. The chromatographic separation material of claim 1, wherein the cross-linked organic polymer particle comprises a pore volume of 0.1 to 3.0 ml/g.

4. A method of chromatographic separation comprising:
providing a stationary phase comprising the chromatographic separation material of claim 1; and
contacting the stationary phase with a mobile phase comprising an analyte so as to separate the analyte.

5. The method of claim 4, wherein the stationary phase is provided by packing the stationary phase in a column.

6. The method of claim 5, wherein the stationary phase fills the inside void of the column.

7. The method of claim 5, wherein the stationary phase is packed along the inside walls of the column.

8. The method of claim 4, wherein the mobile phase comprises a solvent and the analyte is carried in the solvent.

9. The method of claim 4, wherein the analyte comprises an enantiomeric mixture.

* * * * *